United States Patent
Gorman, III et al.

(10) Patent No.: US 9,406,142 B2
(45) Date of Patent: Aug. 2, 2016

(54) FULLY AUTOMATIC IMAGE SEGMENTATION OF HEART VALVES USING MULTI-ATLAS LABEL FUSION AND DEFORMABLE MEDIAL MODELING

(71) Applicant: THE TRUSTEES OF THE UNIVERSITY OF PENNSYLVANIA, Philadelphia, PA (US)

(72) Inventors: Joseph H. Gorman, III, Lower Gwynedd, PA (US); Alison M. Pouch, Abington, PA (US); Robert C. Gorman, Lower Gwynedd, PA (US); Hongzhi Wang, Boiling Springs, PA (US); Paul Yushkevich, Wynnewood, PA (US); Benjamin M Jackson, Wynnewood, PA (US); Brian B. Avants, Philadelphia, PA (US); Chandra M. Sehgal, Wayne, PA (US)

(73) Assignee: The Trustees of the University of Pennsylvania, Philadelphia, PA (US)

(*) Notice: Subject to any disclaimer, the term of this patent is extended or adjusted under 35 U.S.C. 154(b) by 0 days.

(21) Appl. No.: 14/509,342

(22) Filed: Oct. 8, 2014

(65) Prior Publication Data
US 2015/0178938 A1 Jun. 25, 2015

Related U.S. Application Data

(60) Provisional application No. 61/888,270, filed on Oct. 8, 2013.

(51) Int. Cl.
*G06K 9/00* (2006.01)
*G06T 7/00* (2006.01)

(52) U.S. Cl.
CPC ............ *G06T 7/0087* (2013.01); *G06T 7/0081* (2013.01); *G06T 7/0097* (2013.01); *G06T 2207/10136* (2013.01); *G06T 2207/20076* (2013.01); *G06T 2207/20128* (2013.01); *G06T 2207/30048* (2013.01); *G06T 2210/41* (2013.01)

(58) Field of Classification Search
None
See application file for complete search history.

(56) References Cited

PUBLICATIONS

Pouch et al., "Fully automatic segmentation of the open mitral leaflets in 3D transesophageal echocardiographic images using multi-atlas label fusion and deformable medial modeling", 2012 IEEE International Ultrasonics Symposium Proceedings, Oct. 7, 2012.*

(Continued)

*Primary Examiner* — Soo Park
(74) *Attorney, Agent, or Firm* — Baker & Hostetler LLP

(57) ABSTRACT

A fully automatic method for segmentation of the mitral leaflets in 3D transesophageal echocardiographic (3D TEE) images is provided. The method combines complementary probabilistic segmentation and geometric modeling techniques to generate 3D patient-specific reconstructions of the mitral leaflets and annulus from 3D TEE image data with no user interaction. In the model-based segmentation framework, mitral leaflet geometry is described with 3D continuous medial representation (cm-rep). To capture leaflet geometry in a target 3D TEE image, a pre-defined cm-rep template of the mitral leaflets is deformed such that the negative log of a Bayesian posterior probability is minimized. The likelihood of the objective function is given by a probabilistic segmentation of the mitral leaflets generated by multi-atlas joint label fusion, while the validity constraints and regularization terms imposed by cm-rep act as shape priors that preserve leaflet topology and constrain model fitting.

8 Claims, 8 Drawing Sheets

(56) References Cited

PUBLICATIONS

Zagrodsky et al., "Registration-assisted segmentation of real-time 3-D echocardiographic data using deformble models", IEEE Transactions on Medical Imaging, vol. 24, No. 9, Sep. 2005.*

Zhuang, "Challenges and methodologies of fully automatic whole heart segmentation: a review", Journal of Healthcare Engineering, vol. 4, No. 3, 2013, pp. 371-407, published online on Aug. 21, 2013.*

Kirisli et al., "Evaluation of a multi-atlas based method for segmentation of cardiac CTA data: a large-scale, multicenter, and multivendor study", Medical Physics 37, 6279 (2010).*

Lotjonen, et al., "Fast and Robust Multi-Atlas Segmentation of Brain Magnetic Resonance Images," Neuroimage, Feb. 1, 2010, vol. 49(3), pp. 2352-2365.

Abraham, et al., "Feasibility, Accuracy, and Incremental Value of Intraoperative Three-Dimensional Transesophageal Echocardiography in Valve Surgery," Am J Cardial, vol. 80, Dec. 15, 1997, pp. 1577-1582.

Ahmed, et al., "Usefulness of Transesophageal Three-Dimensional Echocardiography in the Identification of Individual Segment/Scallop Prolapse of the Mitral Valve," Echocardiography, vol. 20(2), Feb. 2003 pp. 203-209.

Artaechevarria, et al., "Combination Strategies in Multi-Atlas Image Segmentation: Application to Brain MR Data," IEEE Trans Med Imaging, Feb. 18, 2009, vol. 28(8), pp. 1266-1277.

Avants, et al., "A Reproducible Evaluation of ANTs Similarity Metric Performance in Brain Image Registration," Neuroimage, Feb. 1, 2011, vol. 54, pp. 2033-2044.

Avants, et al., "Symmetric Diffeomorphic Image Registration with Cross-Correlation: Evaluating Automated Labeling of Elderly and Neurodegenerative Brain," Med Image Anal, Feb. 2008, vol. 12, pp. 26-41.

Blum, "A Transformation for Extracting New Descriptors of Shape," In: Wathen-Dunn, W. (Ed.), Models for the Perception of Speech and Visual Form, MIT Press, Cambridge, 1967, pp. 362-380.

Burlina, et al., "Patient-Specific Modeling and Analysis of the Mitral Valve Using 3D-TEE," in Lecture Notes in Computer Science., 2010, vol. 6135, Ed, pp. 135-146.

Collins, et al., "Towards Accurate, Automatic Segmentation of the Hippocampus and Amygdala from MRI by Augmenting Animal with a Template Library and Label Fusion," Neuroimage, Oct. 1, 2010, vol. 52(4), pp. 1355-1366.

De Castro, et al., "Qualitative and Quantitative Evaluation of Mitral Valve Morphology by Intraoperative Volume-Rendered Three-Dimensional Echocardiography," J. Heart Valve Dis., 2002, vol. 11, pp. 173-180.

Eng, et al., "Implementation of Real-Time Three-Dimensional Transesophageal Echocardiography in Percutaneous Mitral Balloon Valvuloplasty and Structural Heart Disease Interventions,"Echocardiography, Sep. 2009, vol. 26(8), pp. 958-966.

Garcia-Orta, et al., "Three-Dimensional Versus Two-Dimensional Transesophageal Echocardiography in Mitral Valve Repair", J. Am. Soc. Echocardiogr., Jan. 2007, vol. 20 (1), pp. 4-12.

Grewal, et al., "Realtime Three-Dimensional Transesophageal Echocardiography in the Intraoperative Assessment of Mitral Valve Disease", J Am Soc Echocardiogr, Jan. 2009, vol. 22(1), pp. 34-41.

Hansen, et al., "Neural Network Ensembles," IEEE Transactions on Pattern Analysis and Machine Intelligence, Oct. 1990, vol. 12(10), pp. 993-1001.

Heckemann, et al., "Automatic Anatomical Brain MRI Segmentation Combining Label Propagation and Decision Fusion," Neuroimage, Oct. 15, 2006, vol. 33(1), pp. 115-126.

Ionasec, et al., "Patient-Specific Modeling and Quantification of the Aortic and Mitral Valves from 4-D Cardiac CT and TEE," IEEE Trans Med Imaging, Sep. 2010; vol. 29, pp. 1636-1651.

Isgum, et al., "Multi-Atlas-Based Segmentation with Local Decision Fusion—Application to Cardiac and Aortic Segmentation in CT Scans," IEEE Trans Med Imaging, Jul. 2009, vol. 28(7), pp. 1000-1010.

Jassar, et al., "Quantitative Mitral Valve Modeling Using Real-Time Three-Dimensional Echocardiography: Technique and Repeatability," Ann Thorac Surg, Jan. 2011, vol. 91, pp. 165-171.

Jenkinson, et al., "A global Optimisation Method for Robust Affine Registration of Brain Images," Med Image Anal, Jan. 8, 2001, vol. 5, pp. 143-156.

Kittler, "Combining Classifiers: A Theoretical Framework," Pattern Anal Appl, Jan. 10, 1998, vol. 1(1), pp. 18-27.

Lang, et al., "3D Echocardiographic Quantification in Functional Mitral Regurgitation," JACC Cardiovasc Imaging, Apr. 4, 2012, vol. 5, pp. 346-347.

Louie, et al., "Transesophageal Echocardiographic Quantitation of Mitral Leaflet Thickness in Patients with Mitral Valve Prolapse," Journal of the American College of Cardiology, Feb. 1995, vol. 25, p. 191A.

Mansi, et al., "An Integrated Framework for Finite-Element Modeling of Mitral Valve Biomechanics from Medical Images: Application to MitralClip intervention planning," Med Image Anal., Oct. 2012, vol. 16(7), pp. 1330-1346.

Papademetris, et al., "Computing 3D Nonrigid Brain Registration Using Extended Robust Point Matching for Composite Multi-Subject fMRI Analysis," Medica/Image Computing and Computer-Assisted Intervention—Miccai, 2003, Pt 2, vol. 2879, pp. 788-795.

Pizer, et al., "Deformable m-reps for 3D Medical Image Segmentation," International Journal of Computer Vision, Jun. 27, 2003, vol. 55, pp. 85-106.

Pouch, et al., "Development of a Semi-Automated Method for Mitral Valve Modeling with Medial Axis Representation Using 3D Ultrasound," Med Phys, Feb. 2012, vol. 39 (2), pp. 933-950.

Pouch, et al., "Semi-Automated Mitral Valve Morphometry and Computational Stress Analysis Using 3D Ultrasound," J Biomech, Mar. 15, 2012, vol. 45, pp. 903-907.

Pouch, et al., Statistical Assessment of Normal Mitral Annular Geometry Using Automated Three-Dimensional Echocardiographic Analysis, Ann Thorac Surg, Jan. 2014, 97, 71-7.

Pouch, et al., "Fully Automatic Segmentation of the Mitral Leaflets in 3D Transesophageal Echocardiographic Images Using Multi-Altas Joint Label Fusion and Deformable Medial Modeling", Medical Image Analysis 18, 2014, 118-129.

Rausch, et al., "Mitrel valve annuloplasty: A Quantitative Clinical and Mechanical Comparison of Different Annuloplasty Devices," Ann Biomed Eng, Mar. 2012, vol. 40(3), pp. 750-761.

Sabuncu, et al., "Image-Driven Population Analysis Through Mixture Modeling," IEEE T Med Imaging, Sep. 2009, vol. 28(9), pp. 1473-1487.

Sacks, et al., "In-Vivo Dynamic Deformation of the Mitral Valve Anterior Leaflet," Ann Thorac Surg, Mar. 21, 2006, vol. 82, pp. 1369-1378.

Sahasakul, et al., "Age-Related Changes in Aortic and Mitral Valve Thickness: Implications for Two-Dimensional Echocardiography Based on an Autopsy Study of 200 Normal Human Hearts," Am J Cardio., Sep. 1, 1988, vol. 62, pp. 424-430.

Schneider, et al., "Modeling Mitral Valve Leaflets from Three-Dimensional Ultrasound," Lecture Notes in Computer Science, Springer-Verlag, Sep. 2011, pp. 215-222.

Schneider, et al., "Patient-Specific Mitral Leaflet Segmentation from 4D Ultrasound," Med Image Comput Assist Interv, Oct. 25, 2011, vol. 14(3), pp. 520-527.

Schneider, et al., in "Mitral Annulus Segmentation from 3D Ultrasound Using Graph Cuts," IEEE Trans Med Imaging, Sep. 2010, vol. 29, pp. 1676-1687.

Sugeng, et al., "Live 3-dimensional transesophageal echocardiography initial experience using the fully sampled matrix array probe", J Am Coll Cardia, Aug. 5, 2008, vol. 52 (6), pp. 446-449.

Sun, et al., "Automatic Cardiac MRI Segmentation Using a Biventricular Deformable Medial Model," Med Image Comput Assist Interv, 2010, vol. 13, pp. 468-475.

Svarer, et al., "MR-Based Automatic Delineation of Volumes of Interest in Human Brain PET Images Using Probability Maps," Neuroimage, Feb. 15, 2005, vol. 24, pp. 969-979.

Swaans, et al., "Three-Dimensional Transesophageal Echocardiography in a Patient Undergoing Percutaneous Mitral

(56) References Cited

OTHER PUBLICATIONS

Valve Repair Using the Edge-to-Edge Clip Technique," Eur J Echocardiogr, Aug. 4, 2009, vol. 10 (8), pp. 982-983.

Tsukiji, et al., "3D Quantitation of Mitral Valve Coaptation by Novel Software System with Transthoracic Real-Time 3D Echocardiography," Circulation, 2006, vol. 114, pp. 716-717.

Vergnat, et al., "Ischemic Mitral Regurgitation: A Quantitative Three-Dimensional Echocardiographic Analysis,"Ann Thorac Surg, Jan. 2011, vol. 91 (1), pp. 157-164.

Veronesi, et al., "Semi-automatic Tracking for Mitral Annulus Dynamic Analysis Using Real-Time 3D Echocardiography," Computers in Cardiology, 2006, vol. 33, pp. 113-116.

Votta, et al., "Mitral Valve Finite-Element Modeling from Ultrasound Data: A Pilot Study for a New Approach to Understand Mitral Function and Clinical Scenarios," Philos Transact A Math Phys Eng Sci, 2008, vol. 366, pp. 3411-3434.

Wang, et al., "Multi-Atlas Segmentation with Joint Label Fusion," IEEE Transactions on Pattern Analysis and Machine Intelligence, Mar. 2013, vol. 35(3), pp. 611-623.

Wang, et al., "Groupwise Segmentation with Multi-Atlas Joint Label Fusion" Med Image Comput Comput Assist Interv., 2013, 16(1), 711-8.

Wang, H., et al., "A Learning-Based Wrapper Method to Correct Systematic Errors in Automatic Image Segmentation: Consistently Improved Performance in Hippocampus, Cortex and Brain Segmentation," Neuroimage, Apr. 1, 2011, vol. 55(3), pp. 968-985.

Wei, et al., "The Routine Use of Live Three Dimensional Transesophageal Echocardiography in Mitral Valve Surgery: Clinical Experience," Eur J Echocardiogr, 2010, vol. 11, pp. 14-18.

Witschey, et al., "Three-Dimensional Ultrasound-Derived Physical Mitral Valve Modeling", Ann Thorac Surg, Aug. 2014, 98(2), pp. 691-694.

Yushkevich, "Continuous Medial Representation of Brain Structures Using the Biharmonic PDE," Neuroimage, Mar. 2009 vol. 45(1), pp. S99-S110.

Yushkevich, et al., "Continuous Medial Representation for Anatomical Structures," IEEE Trans Med Imaging, Dec. 25, 2006, vol. 25, pp. 1547-1564.

Yushkevich, et al., "User-Guided 3D Active Contour Segmentation of Anatomical Structures: Significantly Improved Efficiency and Reliability," Neuroimage, Jul. 2006, vol. 31(3), pp. 1116-1128.

Yushkevich, et al., "Deformable Modeling Using a 3D Boundry Representation with Quadratic Constraints on the Branching Structure of the Blum Skeleton", LNCS, 2013, vol. 7917, pp. 280-291.

\* cited by examiner (a)　　(b)　　(c)

diastole systole target image | multi-atlas segmentation | model initialization | deformable modeling | fitted medial model

FULLY AUTOMATIC IMAGE SEGMENTATION OF HEART VALVES USING MULTI-ATLAS LABEL FUSION AND DEFORMABLE MEDIAL MODELING

CROSS-REFERENCE TO RELATED APPLICATIONS

This application claims priority to U.S. Provisional Application No. 61/888,270, filed on Oct. 8, 2013, the entire contents of which are hereby incorporated by reference.

GOVERNMENT RIGHTS

The subject matter disclosed herein was made with government support under grant numbers HL063954, HL073021, HL103723, HL119010, AG037376, and CA130946 awarded by the National Institutes of Health and under grant number 10PRE3510014 awarded by the American Heart Association. The Government has certain rights in the herein disclosed subject matter.

TECHNICAL FIELD

The invention relates to quantitative image analysis and, more particularly, to a fully automated method for mitral leaflet segmentation in 3D images, such as transesophageal echocardiographic ultrasound images.

BACKGROUND

In a physiologically normal state, the mitral valve maintains unidirectional blood flow across the left heart, and its geometry and mechanics are essential to proper cardiac function. The valve consists of two leaflets (anterior and posterior), a fibro-elastic ring (the annulus) which anchors the leaflets to the surrounding heart tissue, and a subvalvular apparatus comprised of chordae tendinae and papillary muscles that synchronize mitral leaflet, annular, and left ventricular wall motion.

Three dimensional transesophageal echocardiography (3D TEE) has been effectively used in both research and clinical settings to visualize and quantify mitral valve morphology and motion in vivo (Abraham, T. P., et al., "Feasibility, accuracy, and incremental value of intraoperative three-dimensional transesophageal echocardiography in valve surgery," *Am J Cardiol*, Vol. 80, pp. 1577-1582 (1997); Ahmed, S., et al., "Usefulness of transesophageal three-dimensional echocardiography in the identification of individual segment/scallop prolapse of the mitral valve," *Echocardiography*, Vol. 20, pp. 203-209 (2003); Grewal, J., et al., "Real-time three-dimensional transesophageal echocardiography in the intraoperative assessment of mitral valve disease,". *J Am Soc Echocardiogr*, Vol. 22, pp. 34-41 (2009); Sugeng, L., et al., "Live 3-dimensional transesophageal echocardiography initial experience using the fully-sampled matrix array probe," *J Am Coll Cardiol*, Vol. 52, pp. 446-449 (2008); Vergnat, M., et al., "Ischemic mitral regurgitation: a quantitative three-dimensional echocardiographic analysis," *Ann Thorac Surg*, Vol. 91, pp. 157-164 (2011); Veronesi, F., et al., "Semi-automatic tracking for mitral annulus dynamic analysis using real-time 3D echocardiography," *Computers in Cardiology*, Vol. 33, pp. 113-116 (2006); and Wei, J., et al., "The routine use of live three-dimensional transesophageal echocardiography in mitral valve surgery: clinical experience," *Eur J Echocardiogr*, Vol. 11, pp. 14-18 (2010)). Comprehensive evaluation of 3D valve morphology is essential for the diagnosis and surgical treatment of many valvular heart diseases, especially those associated with complex morphological abnormalities. Ischemic mitral regurgitation, in particular, manifests as a variable combination of distortions in valve geometry: annular dilatation and apical leaflet tethering. These distortions are patient-specific and underscore distinct pathophysiologic mechanisms and abnormalities.

3D examination of patient-specific valve anatomy is a prerequisite for disease characterization and selection of appropriate surgical treatment strategies. 3D TEE has been demonstrated to be a valuable tool in preoperative surgical planning (Garcia-Orta, R. et al., "Three-Dimensional versus two-dimensional transesophageal echocardiography in mitral valve repair, *J. Am. Soc. Echocardiogr.*, Vol. 20, pp. 4-12 (2007)), intraoperative guidance (Eng, M. H., et al., "Implementation of real-time three-dimensional transesophageal echocardiography in percutaneous mitral balloon valvuloplasty and structural heart disease interventions," *Echocardiography*, Vol. 26, pp. 958-966 (2009); Swaans, M. J., et al., "Three-dimensional transesophageal echocardiography in a patient undergoing percutaneous mitral valve repair using the edge-to-edge clip technique," *Eur J Echocardiogr*, Vol. 10, pp. 982-983 (2009)), and immediate and long-term follow-up to determine the need for further cardiological surgical intervention (De Castro, S., et al., "Qualitative and quantitative evaluation of mitral valve morphology by intraoperative volume-rendered three-dimensional echocardiography," *J. Heart Valve Dis.*, Vol. 11, pp. 173-180 (2002)). However, the limitation of the current commercial 3D TEE imaging platforms is that they provide visually impressive 3DE image volume renderings, but enable only a limited number of quantitative measurements to be made off-line with somewhat cumbersome user interaction. The existing 3D TEE image analysis tools are therefore impractical and inadequate for use in quantitative image-based surgical planning.

To increase the practicality and ease of mitral valve quantification with 3D TEE, several semi-automatic and one fully automatic method for mitral leaflet segmentation have been proposed by R. I. Ionasec, et al., "Patient-specific modeling and quantification of the aortic and mitral valves from 4-D cardiac CT and TEE," *IEEE Trans Med Imaging*, vol. 29, pp. 1636-51, September 2010; P. Burlina, et al., "Patient-specific modeling and analysis of the mitral valve using 3D-TEE," in *Lecture Notes in Computer Science*. vol. 6135, ed, 2010, pp. 135-146; Pouch, A. M., et al., "Development of a semi-automated method for mitral valve modeling with medial axis representation using 3D ultrasound," *Med Phys*, Vol. 39, pp. 933-950 (2012); and Schneider, R. J., et al., "Modeling mitral valve leaflets from three-dimensional ultrasound," *Lecture Notes in Computer Science*, Springer-Verlag, pp. 215-222 (2011)). The goal of these techniques is to derive quantitative measurements and 3D visualizations of annular and leaflet geometry from 3D TEE images. The methods vary in the extent of requisite user interaction and the level of detail with which the mitral leaflets are represented.

FIG. 1 illustrates several of the challenges specific to mitral leaflet and annular segmentation in 3D TEE images. In FIG. 1, cross-sectional images of 3D TEE image volumes at diastole (left and center) and systole (right) illustrate the challenges specific to mitral leaflet segmentation. The top arrows points toward points on the annulus, showing that there is no image-based boundary between the mitral leaflets and adjacent tissue to which the leaflets are attached. The lower arrow in the left and center images points towards the posterior leaflet at diastole, which is often pressed against the ventricular wall and is characterized by signal dropout. The lower arrow in the right image points to the coaptation zone of the leaflets at systole, showing there is no intensity-based demarcation between the anterior and posterior leaflets. As shown in FIG. 1, there is no intensity-based boundary between the leaflets and adjacent heart tissue, making it difficult to identify the annulus and leaflet boundaries based in image intensity information alone. Also, the posterior leaflet often gets pressed against the left ventricular wall during diastole and is characterized by signal dropout, making it difficult for an automated segmentation algorithm to capture posterior leaflet geometry when the valve is open. In addition, the anterior and posterior leaflets are difficult to distinguish in the coaptation zone during systole since there is no intensity-based distinction between the two leaflets.

To address these challenges, Schneider and colleagues in Schneider, R. J., et al., "Patient-specific mitral leaflet segmentation from 4D ultrasound," *Med Image Comput Assist Interv*, Vol. 14, pp. 520-527 (2011) present a multi-stage method for segmenting the open mitral leaflets in 3D TEE data sets, wherein the leaflets are represented by a discrete mesh. First, the mitral annulus is semi-automatically segmented as described by Schneider, R. J., et al., in "Mitral annulus segmentation from 3D ultrasound using graph cuts," *IEEE Trans Med Imaging*, Vol. 29, pp. 1676-1687 (2010), and an initial leaflet search space is defined in the image volume. The search space is subsequently refined, and the leaflet surfaces are estimated using graph cut and active contour methods. This technique requires some minimal user interaction to generate patient-specific leaflet representations. Ionasec and colleagues describe a fully automatic technique for segmenting and tracking the aortic and mitral leaflets in computed tomography and 3D TEE data. Given a large database of manually labeled images, machine learning algorithms are used to globally locate and then track several valve landmarks throughout the cardiac cycle. Leaflet geometry is subsequently represented by a parametric model fitted through these points. While this method is fully automated and establishes correspondences, the use of sparse landmarks potentially limits patient-specific detail of leaflet geometry. The techniques described by Schneider et al. and Ionasec et al. both represent the mitral leaflets as a single surface, rather than structures with thickness. Alternatively, Burlina et al. use 3D active contours and thin tissue detection to recover mitral leaflet geometry at end-diastole in 3D TEE image data. While this method captures detail of leaflet geometry, it requires user initialization and manual refinement. Several other techniques, largely based on manual leaflet tracing in either custom or commercial software, have also been proposed (Vergnat et al. (2011); Tsukiji, M., et al., "3D quantitation of mitral valve coaptation by novel software system with transthoracic real-time 3D echocardiography," *Circulation*, Vol. 114, pp. 716-717(2006); and Veronesi et al., (2006)). While these techniques provide spatially dense, expert-defined representations of leaflet and annular geometry, they are the most labor intensive methods.

Although automatic 3D quantification tools have significant implications for diagnostics and surgical care, the existing methodologies remain labor and time intensive. Methods that reduce inter-observer variability in 3D TEE image analysis would maximize its practicality for use at the bedside and in the operating room (Lang, R. M., and Adams, D. H., "3D echocardiographic quantification in functional mitral regurgitation," *JACC Cardiovasc Imaging*, Vol. 5, pp. 346-347 (2012)). A goal of the present invention is to develop an alternative, leaflet segmentation method that is fully automated, captures patient-specific detail, represents the leaflets with finite thickness, and establishes correspondences on valves of different subjects. To accomplish these goals, the inventors propose a segmentation technique that integrates probabilistic segmentation and geometric modeling techniques. These complementary methods are multi-atlas joint label fusion and deformable modeling with continuous medial representation (cm-rep).

Cm-rep is a type of shape representation that describes an object in terms of its medial geometry, i.e. a radial thickness field mapped to a skeleton, or medial axis (Pizer, S. M., et al., "Deformable m-reps for 3D medical image segmentation," *International Journal of Computer Vision*, Vol. 55, pp. 85-106 (2003); and Yushkevich, P. A., et al., "Continuous medial representation for anatomical structures," *IEEE Trans Med Imaging*, Vol. 25, pp. 1547-1564 (2006)). The representation has been used to model various anatomical shapes, including the hippocampus (Yushkevich, P. A., "Continuous medial representation of brain structures using the biharmonic PDE," *Neuroimage*, Vol. 45, pp. S99-110 (2009)) and cardiac ventricles (Sun, H., et al., "Automatic cardiac MRI segmentation using a biventricular deformable medial model," *Med Image Comput Assist Interv*, Vol. 13, pp. 468-475 (2010)), and is especially useful for modeling thin, sheet-like structures. The inventors have previously shown that cm-rep is an appropriate shape model for describing mitral leaflet and annular geometry (Pouch et al., 2012). It establishes correspondences on different valve shapes and facilitates measurement of clinically relevant features of annular and leaflet geometry. In earlier work by the present inventors, the cm-rep of a given valve shape is obtained by deforming a pre-defined template by Bayesian optimization to match a user-initialized segmentation of the leaflets (Pouch, A. M., et al., "Semi-automated mitral valve morphometry and computational stress analysis using 3D ultrasound," *J Biomech*, Vol. 45, pp. 903-907 (2012); Pouch et al., 2012). This user-initialized segmentation method, based on 3D active contours with region competition, requires multiple interactive steps to identify valve location in the image volume, establish boundaries between the leaflets and adjacent heart tissue, and estimate a threshold to guide region competition. In the present invention, the need for user initialization is completely eliminated with the use of multi-atlas joint label fusion to generate probabilistic segmentations that guide model fitting.

Given a target image to segment, multi-atlas joint label fusion registers a set of manually labeled atlases of the mitral leaflets to the target image and propagates the segmentation labels to this target image. Joint label fusion assigns weights to the labels of different atlases based on the similarity between the atlas and target image, as well as the similarity between different atlases (Wang, H. Z., et al., "Multi-Atlas Segmentation with Joint Label Fusion," *IEEE Transactions on Pattern Analysis and Machine Intelligence*, Vol. 35, pp. 611-623 (2013). Although label fusion alone can generate segmentations of the mitral leaflets, the technique does not preserve leaflet topology or assign correspondences to different valve shapes. A method is desired that overcomes these challenges and the other challenges note above.

SUMMARY

To overcome the above-mentioned challenges, the probabilistic segmentation obtained with joint label fusion is incorporated as the likelihood term of the objective function optimized during deformable modeling with cm-rep. In effect, a model-based Bayesian segmentation of the target image is performed, where joint label fusion specifies the likelihood and the regularization terms imposed by cm-rep act as shape priors that preserve leaflet topology and constrain model fitting. The inventors' demonstrate that these two complementary techniques generate accurate, patient-specific representations of mitral leaflet geometry without any need for user interaction. The segmentation method is applied to different time points in the cardiac cycle, mid-systole and mid-diastole, to test if it can effectively capture different geometric configurations of the mitral leaflets. Those skilled in the art will further appreciate that the methods described herein may be used to automatically segment aortic, pulmonic, and/or tricuspid valves in addition to the mitral valve.

In particular, the present invention provides a fully automated leaflet segmentation method that captures patient-specific detail, represents the leaflets as structures with locally varying thickness, and establishes correspondences on valves of different subjects. The algorithm is for analyzing 3D images of, for example, the mitral valve and provides a platform for visual and quantitative assessment of in vivo mitral valve morphology, which can assist in pre-operative planning of mitral valve repair surgery. The technique of the invention combines probabilistic segmentation and geometric modeling methods: multi-atlas joint label fusion and deformable modeling with continuous medial representation (cm-rep). The approach is based on one-time development of reference atlases (manually labeled 3D images) of the mitral valve by experts and using them (instead of user input) to generate a probabilistic guide to image segmentation. In addition, the method includes one-time development of a deformable template (cm-rep) that the user interactively creates. The final image segmentation is obtained by automatically deforming this template under the guidance of the probabilistic segmentation generated from reference atlases. Except for this one-time need to develop reference atlases and a deformable template, which requires user input, the method does not require expert knowledge for segmentation and geometric modeling and is thus fully automated. The method captures patient-specific morphological detail, represents the leaflets with finite thickness, and establishes correspondences on valves of different subjects. These methods are integrated in a model-based Bayesian segmentation framework. Results are shown for 3D TEE images acquired at mid-diastole, when the mitral leaflets are easily distinguished.

The algorithm for analyzing 3D images, such as 3D ultrasound images, of the mitral valve has two components: probabilistic segmentation of the 3D ultrasound image and geometric modeling of the valve. Using the mitral valve template and the probabilistic segmentation as input, multi-atlas label fusion and deformable modeling creates a 3D geometric model of the mitral leaflets in a 3D TEE target image. The 3D geometric models may then be used to assist in the diagnosis of mitral valve disease, to guide surgical interventions such as mitral valve repair, and as input to biomechanical formulations of valve function.

In an exemplary embodiment, the method includes capturing a target mitral valve image and fitting a deformable model of the mitral valve to the captured target mitral valve image using an optimization algorithm, such as a Bayesian optimization algorithm, to create a patient-specific geometric model of the patient's mitral valve. In this model fitting process, the Bayesian likelihood is given by the multi-atlas joint label fusion probabilistic segmentation maps and the prior probability is based on constraints in the cm-rep geometric modeling framework. The method includes acquiring a 3D target image to segment, registering the image atlases to the target image and propagating atlas labels to the target image to obtain a set of candidate segmentations, generating a probabilistic consensus segmentation using joint label fusion, and applying 3D deformable modeling to the probabilistic consensus segmentation to generate a 3D geometric model of the mitral leaflets and/or annulus in the target image. The multi-atlas joint label fusion process is desirable in that it uses a spatially varied weighted voting scheme and accounts for redundancies in the atlas set. The multi-atlas joint label fusion process also provides a fully automated probabilistic segmentation method that encodes knowledge of valve shape and image appearance. Deformable medial modeling, on the other hand, preserves topology, enforces correspondences, and imposes regularization constraints to provide a useful shape representation for clinical morphometry. Deformable modeling with cm-rep also corrects for labeling inaccuracies and topological inconsistencies.

Those skilled in the art will appreciate that the methods of the invention are not limited to transesophageal echocardiogram images but may also be applied to transthoracic echocardiogram images as well. Also, those skilled in the art will appreciate that the methods described herein may be used to automatically segment aortic, pulmonic, and/or tricuspid valves in addition to the mitral valve. These and other variations of the invention will be apparent from the following detailed description.

BRIEF DESCRIPTION OF THE DRAWINGS

The various novel aspects of the invention will be apparent from the following detailed description of the invention taken in conjunction with the accompanying drawings, of which.

DETAILED DESCRIPTION OF ILLUSTRATIVE EMBODIMENTS

The invention will be described in detail below with reference to FIGS. 2-13. Those skilled in the art will appreciate that the description given herein with respect to those figures is for exemplary purposes only and is not intended in any way to limit the scope of the invention. All questions regarding the scope of the invention may be resolved by referring to the appended claims.

Methods

1. Image Acquisition

Twenty patients undergoing cardiac surgery at the University of Pennsylvania were imaged pre-operatively using real-time 3D TEE. This cohort included 6 subjects with normal mitral valve anatomy and function, 6 subjects with mild mitral regurgitation undergoing surgery for either coronary artery or aortic valve disease, and 8 subjects with severe ischemic mitral regurgitation undergoing mitral valve repair surgery. The imaging protocol was approved by the University of Pennsylvania School of Medicine Institutional Review Board. All studies were performed after induction of general anesthesia and before initiation of cardiopulmonary bypass. Electrocardiographically gated full-volume images were acquired with the iE33 platform (Philips Medical Systems, Andover, Mass.) using a 2 to 7 MHz transesophageal matrix-array transducer over four consecutive cardiac cycles. No restrictions were specified for the orientation or angulation of the transesophageal probe. The frame rate was 17 to 30 Hz, and the imaging depth was 12 to 16 cm. From each subject's data series, 3D TEE images of the mitral valve at mid-systole and mid-diastole were selected for analysis. These 3D TEE images were exported in Cartesian format (224×208×208 voxels), with an approximate isotropic resolution of 0.6 to 0.8 mm.

2. Manual Segmentation

The 40 images selected for analysis were traced in ITK-SNAP (Yushkevich, P. A., et al., "User-guided 3D active contour segmentation of anatomical structures: significantly improved efficiency and reliability," *Neuroimage*, Vol. 31, pp. 1116-1128 (2006)), an open-source software package for medical image segmentation. The 40 images consisted of two per subject, one acquired at diastole and one at systole. An expert observer manually segmented the anterior and posterior leaflets in their entirety, associating the two leaflets with separate labels (label 1=anterior leaflet, label 2=posterior leaflet). All unmarked voxels were assigned label 0, corresponding to the image background. The final products of manual segmentation were two separate atlas sets: one consisting of 20 labeled images at diastole and the second consisting of 20 labeled images at systole. Manual segmentation was performed without knowledge of mitral valve pathology.

3. Automatic Segmentation

Figure 1:
FIG. 1 illustrates several of the challenges specific to mitral leaflet and annular segmentation in 3D TEE images.
Figure 2:
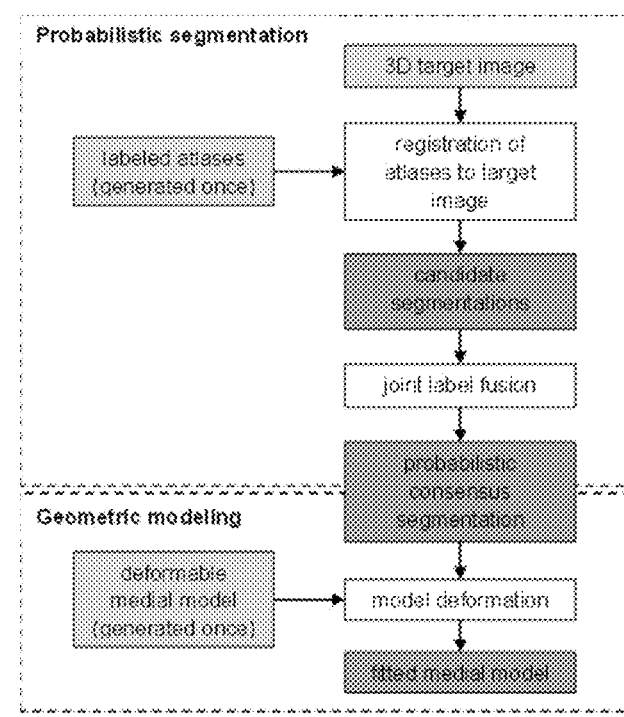
FIG. 2 illustrates a schematic of the automatic segmentation algorithm in accordance with an exemplary embodiment of the invention.
Figure 3:
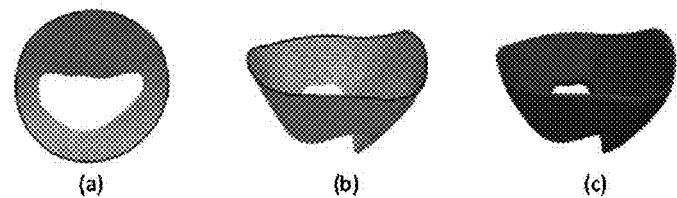
FIG. 3 illustrates generation of a set of 3D TEE atlases of the mitral valve and construction of a 3D deformable template of the open leaflets.

A schematic of the automatic segmentation algorithm is presented in FIG. 2. In FIG. 2, the input is shown in light gray and the intermediate products and output are shown in dark gray. First, a set of 3D TEE atlases of the mitral leaflets is generated and a deformable medial model is constructed. Atlas and template generation is performed once. Given a 3D target image to segment, the atlases are registered to the target image and the atlas labels are propagated to the target image to obtain a set of candidate segmentations. Joint label fusion generates a probabilistic consensus segmentation, which is used to guide 3D deformable modeling. The output of the algorithm is a 3D geometric model of the mitral leaflets in the target image. As shown in FIG. 2, first a set of 3D TEE atlases of the mitral valve are generated and a 3D deformable template of the open leaflets is constructed (FIG. 3). As shown in FIG. 3, cm-rep template of the open mitral leaflets used for deformable modeling. FIG. 3(a)-(b) illustrate the medial manifold of the template as a triangulated mesh, with lighter nodes referring to the anterior leaflet and darker labels referring to the posterior leaflet. The mitral annulus is represented by the bold black curve on the outer medial edge. FIG. 3(c) illustrates the boundary constructed analytically from the medial manifold, given a constant radial thickness for initialization. The two steps of generating a set of 3D TEE atlases of the mitral valve and constructing a 3D deformable template of the open leaflets are performed once. Given an unseen 3D TEE target image to segment, the atlases are registered to the target image to obtain a set of candidate segmentations. Subsequently, joint label fusion generates a probabilistic consensus segmentation of the target image, which is used to guide 3D deformable medial modeling. The output is a 3D geometric model of the mitral leaflets in the target image volume.

Figure 4:
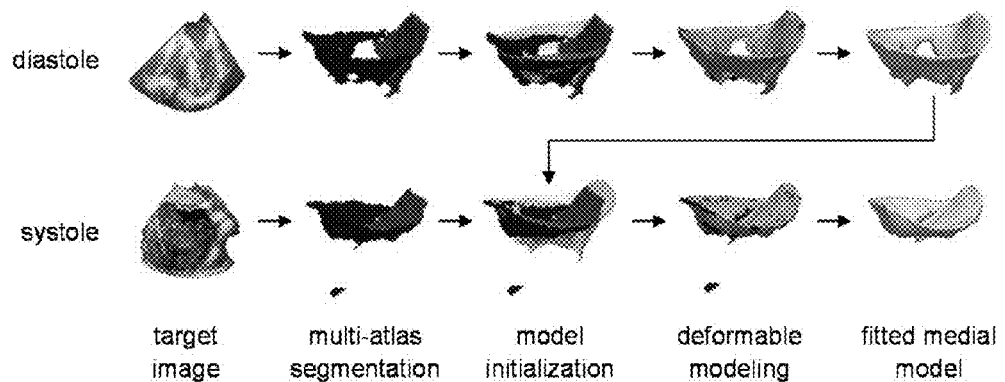
FIG. 4 illustrates the segmentation and geometric modeling of the mitral leaflets for a given subject.

FIG. 4 illustrates the segmentation and geometric modeling of the mitral leaflets for a given subject. Segmentation of the diastolic image volume is performed first. Then, segmentation of the systolic image volume is performed using the same subject's open-valve medial model for initialization of closed-valve model fitting. FIG. 4 illustrates automatic segmentation of the mitral leaflets at diastole (top row) and systole (bottom row) for a given patient. First, a probabilistic segmentation is generated by multi-atlas label fusion (light shading=anterior leaflet, dark shading=posterior leaflet). Then the cm-rep template (translucent) is initialized to the multi-atlas segmentation and the template is deformed to obtain a medial model of the mitral leaflets. The medial template shown in FIG. 3 is used for model initialization at diastole, and the fitted diastolic model is used to initialize model fitting of the same subject's valve at systole. Background information on these methods is presented in Sections 3.1 and 3.2 below.

3.1. Multi-Atlas Joint Label Fusion

Multi-atlas label fusion is a segmentation strategy that has been applied to a number of medical image segmentation problems, most notably magnetic resonance imaging of the brain (Artaechevarria, X., et al., "Combination strategies in multi-atlas image segmentation: application to brain MR data," *IEEE Trans Med Imaging*, Vol. 28, pp. 1266-1277 (2009); Heckemann, R. A., et al., "Automatic anatomical brain MRI segmentation combining label propagation and decision fusion," *Neuroimage*, Vol. 33, pp. 115-126 (2006); Lotjonen, J. M., et al., "Fast and robust multi-atlas segmentation of brain magnetic resonance images," *Neuroimage*, Vol. 49, pp. 2352-2365 (2010); and Svarer, C., et al., "MR-based automatic delineation of volumes of interest in human brain PET images using probability maps," Neuroimage, Vol. 24, pp. 969-979 (2005). The method makes use of a set of expert-labeled atlases, where each atlas consists of a sample image and a set of labels for the anatomic structures in that image. When a new target image is presented for segmentation, each atlas image is registered to the target image. The deformation fields obtained by registration are then used to propagate the atlas labels to the target image. Depending on dissimilarities in anatomy and appearance between the atlas and target images, each atlas produces a different segmentation of the target image. Multi-atlas label fusion strategies combine these results, either by majority or weighted voting, to produce a consensus or probabilistic segmentation of the target image.

Majority voting methods count votes for each label from each atlas and select the label receiving the majority of votes to produce the final segmentation (Hansen, L. K., and Salamon, P., "Neural Network Ensembles," *IEEE Transactions on Pattern Analysis and Machine Intelligence*, Vol. 12, pp. 993-1001 (1990); Kittler, J., "Combining classifiers: A theoretical framework," *Pattern Anal Appl*, Vol. 1, pp. 18-27 (1998)). Alternatively, in weighted voting methods, each atlas contributes to the final segmentation according to a weight, with atlases more similar to the target image receiving higher weights (Heckemann et al., 2006; Isgum, I., et al., "Multi-atlas-based segmentation with local decision fusion—application to cardiac and aortic segmentation in CT scans," *IEEE Trans Med Imaging*, Vol. 28, pp. 1000-1010 (2009); Sabuncu, M. R., et al., "Image-Driven Population Analysis Through Mixture Modeling," *IEEE T Med Imaging*, Vol. 28, pp. 1473-1487 (2009)). In some cases, information from atlases that are globally or locally dissimilar to the target image will be discarded during voting (Artaechevarria et al., 2009; Collins and Pruessner, "Towards accurate, automatic segmentation of the hippocampus and amygdala from MRI by augmenting ANIMAL with a template library and label fusion," *Neuroimage*, Vol. 52, pp. 1355-1366 (2010)). It has been demonstrated that voting methods with spatially varying weights derived from local similarities between the atlas and target image are most effective in practice (Artaechevarria et al., 2009; Isgum et al., 2009; Sabuncu et al., 2009). The drawback of many majority and weighted voting methods, however, is that they assign weights to each atlas independently without considering similarities between different atlases. In other words, the methods assume that errors produced by different atlases are uncorrelated. This assumption can lead to labeling inaccuracies caused by replication or redundancy in the atlas set.

Joint label fusion is an extension of multi-atlas label fusion with weighted voting that reduces segmentation errors produced by redundancies in the atlas set (Wang et al., 2013). When computing voting weights, the method accounts for both similarity between each atlas and the target as well as similarity between atlases, under the assumption that the expected label error produced by one atlas is large when the image intensity difference between the warped atlas and target image is large. The expectation that any two atlases both produce a label error is large only when both atlases have large intensity differences from the target image. As described by Wang and colleagues (2013), weighted voting is formulated in terms of minimizing the total expected labeling error in the final estimated segmentation, which requires knowledge of the expected pairwise joint label differences between the atlas and target images. Since this information is unknown, the joint label differences are explicitly modeled and estimated based on local intensity similarities between the atlases and target image. Spatially-varying voting weights are efficiently solved in a closed form. The result of multi-atlas joint label fusion is a probabilistic segmentation, where each voxel in the target image space is assigned a probability of having a given label. A final segmentation is produced by assigning each voxel the label with the greatest probability.

In accordance with the method of the invention, intensity-based registration is performed between all pairs of reference atlases, as well as between all reference atlases and the target image. Registration includes two stages. First, the FSL FLIRT tool (Jenkinson, M., and Smith, S., "A global optimisation method for robust affine registration of brain images," *Med Image Anal*, Vol. 5, pp. 143-156 (2001)) is used to perform global registration with six degrees of freedom. Second, the ANTS Symmetric Normalization algorithm (Avants, B. B., et al., "Symmetric diffeomorphic image registration with cross-correlation: evaluating automated labeling of elderly and neurodegenerative brain," *Med Image Anal*, Vol. 12, pp. 26-41 (2008)) is used to perform deformable registration. Cross-correlation is the similarity metric used for registration, and a Gaussian regularizer with sigma=3 is applied. Finally, each atlas is warped into the target image space using the obtained deformation fields, generating a candidate segmentation of the target image. The candidate labels are then fused to create probabilistic consensus segmentation according to the method described in Wang et al., 2013.

3.2. Deformable Modeling with Continuous Medial Representation

Once probabilistic segmentations are generated with multi-atlas joint label fusion, the mitral leaflets are geometrically modeled using cm-rep, a continuous form of medial representation (Yushkevich, 2009). Briefly, a medial model is a type of shape representation that describes an object's geometry in terms of its skeleton, or medial axis. Blum, H., in "A transformation for extracting new descriptors of shape," In: Wathen-Dunn, W. (Ed.), *Models for the Perception of Speech and Visual Form*, MIT Press, Cambridge, pp. 362-380 (1967) has defined the medial axis of an object as a locus of the centers of maximal inscribed balls (MIBs) that lie inside the object and cannot be made any larger without crossing the object boundary. The center of each MIB is associated with a radius R, the distance between that point on the skeleton and the object boundary. While there are a number of methods for defining or extracting an object's medial geometry, cm-rep makes use of deformable modeling and inverse skeletonization (Pizer et al., 2003; Yushkevich et al., 2006). The technique begins with a deformable medial model, or template, of an object with pre-defined topology. The skeleton of the model is explicitly represented as a set of continuous parametric manifolds m: $\Omega \to \mathbb{R}^3$, $\Omega \in \mathbb{R}^2$, and object thickness $R: \Omega \to \mathbb{R}^+$ is modeled parametrically as a scalar field defined over the skeleton. Given a new instance of the object, the template is deformed through Bayesian optimization such that the object's skeleton is defined first, and then the object boundary is derived analytically from the skeleton. The result is a fitted cm-rep of the object that describes its shape in terms of medial geometry, a radial thickness field R mapped to one or more medial manifolds m. An advantage of deformable medial modeling is that it imposes a shape-based coordinate system on the object and thereby establishes correspondences on different instances of that object. Moreover, it ensures that different instances of the object have consistent topology, which is not necessarily guaranteed by other shape recovery methods.

In accordance with the methods of the invention, the deformable cm-rep of the mitral leaflets is represented by a single non-branching medial manifold illustrated in FIG. 3. The manifold is discretely represented as a triangulated mesh using a Loop subdivision surface scheme and is constructed in a manner similar to that described in Pouch et al., 2012. In this approach, the template is generated by computing the Voronoi skeleton of a pre-existing open-valve segmentation, pruning the skeleton to obtain the desirable single-sheet branching structure, fitting the single-sheet skeleton with a parametric surface, and triangulating. The segmentation used to create the template is from a single subject (not included as an atlas herein), but the steps described above cause the shape to undergo considerable smoothing and simplification so that it becomes a rather generic representation of the open mitral leaflets shown in FIG. 3. The inventors have demonstrated in Pouch et al., 2012 that the performance of cm-rep model fitting to mitral leaflet segmentations is robust to the choice of the data set used to generate the template. Unlike the inventors' previous work, the anterior and posterior leaflets are represented in the present methods by a single labeled medial manifold, rather than separate manifolds for each leaflet. The medial mesh has 146 control points. Each control point is a tuple of values (m, R, L), where m=$(m_x, m_y, m_z)$ are the point coordinates in $\mathbb{R}^3$, R is the radial thickness or distance from that node to the leaflet's atrial and ventricular surfaces, and L is a label corresponding to either the anterior or posterior leaflet. The nodes on the outer medial edge correspond to the mitral annulus, and the nodes on the inner medial edge correspond to the free edges of the leaflets. In FIG. 3, the anterior leaflet nodes are lightly shaded, the posterior leaflet nodes are darkly shaded, and the mitral annulus is demarcated by a bold black curve. When the model is fitted to image data, the control point mesh is subdivided by applying using Loop subdivision surface rules twice, which results in a mesh with 1886 vertices. The boundary mesh is derived from the subdivided medial mesh using inverse skeletonization and has 3504 vertices.

To capture leaflet geometry in a target image, the cm-rep template is deformed such that the negative log of a Bayesian posterior probability is minimized. The Bayesian objective function consists of a likelihood term, regularization prior, and penalties used to ensure that inequality constraints required for inverse skeletonization are met:

$$-\log(p(M \mid I)) \sim w_{likelihood} \cdot T_{likelihood} + \sum_i w_{regularity_i} \cdot T_{regularity_i} + \sum_j w_{validity_j} \cdot T_{validity_j} \qquad [1]$$

Here, p(M|I) In is the probability of observing the model M given the target image I, and w are the relative weights of terms T. The first term in Eq. 1, $T_{likelihood}$, is proportional to the negative log of p(I|M), the probability of observing the target image I given the model M. This term is driven by the probability maps given by multi-atlas joint label fusion. The sum of the weighted terms $T_{regularity}$ and $T_{validity}$ is proportional to the negative log of p(M), the prior probability enforced by constraints in the cm-rep deformable modeling framework.

The likelihood of the Bayesian posterior energy is constructed as a probability integral term that utilizes the probabilistic segmentation maps, $P^l(x)$, generated by multi-atlas joint label fusion. Suppose that $P^l(x)$ is the probability of voxel x having the label l, where l has three possible values: 0 (background), 1 (anterior leaflet), and 2 (posterior leaflet). The likelihood is formulated as follows:

$$-\log(p(I \mid M)) \sim 1 - \frac{\Sigma_l P^l(x) \mid_{M_l}}{I_{volume}} \qquad [2]$$

where l indexes through each label, x indexes through the image voxels, $I_{volume}$ is the target image volume given in pixels, and $M_l$ represents the part of the model M associated with label l. Here, $M_1$ and $M_2$ refer to the anterior and posterior leaflets and $M_0$ refers to the exterior of the model. Note that this term samples probabilities over the entire target image domain. For segmentation of the open leaflets, $P^l(x)$ ranges from 0 to 1. For segmentation of the closed leaflets, $P^l(x)$ is either 0 or 1, where the value 1 is assigned to the label with the highest probability at x. The use of binary values for $P^l(x)$ at systole strengthens model fitting in the coaptation zone since the closed leaflets are most challenging to distinguish in this region and probability assignments are relatively low.

The second set of terms in Equation 1 constitutes the regularization prior that controls the smoothness of the outer medial edge and penalizes non-uniform expansion and contraction of the mitral leaflets during model fitting. Given N nodes on the outer edge of the triangulated medial mesh, the first regularization term consists of two components. The first component penalizes the angle between adjacent normal vectors around the medial edge, and the second penalizes the angle between consecutive line segments along the outer medial edge:

$$T_{regularity_1} = \sum_{i=1}^{N} [(1 - \cos(\theta_i)) + (1 - \cos(\phi_i))] \qquad [3]$$

where $\theta_i$ is the angle between the outward normals at adjacent outer edge nodes $m_i$ and $m_{i+1}$, and $\phi_i$ is the angle between adjacent line segments formed by nodes $m_{i-1}$ and $m_i$ and nodes $m_i$ and $m_{i+1}$. In effect, this term prevents twisting and rippling of the medial manifold's outer edge during model deformation.

The second regularization term penalizes non-uniform expansion and contraction of the mitral leaflets. This term has a low weight during open leaflet model fitting, when it is used to strengthen correspondences on the valves of different subjects. The term has a higher weight during closed leaflet fitting, when the open leaflet model for a given subject is deformed to estimate the closed valve geometry. In this case, the term is primarily used to ensure accurate correspondences on the same subject's valve at different time points. The term has two components: a medial Jacobian distortion penalty and boundary Jacobian distortion penalty, which penalize the Jacobians of the medial manifold and leaflet boundaries, respectively. The term is formulated as follows:

$$T_{regularity_2} = \nabla_m \log\left(\frac{A_m}{A_{m,ref}}\right) + \nabla_b \log\left(\frac{A_b}{A_{b,ref}}\right) \qquad [4]$$

where $A_m$ and $A_b$ refer to the area of triangles on the medial manifold and model boundary, $A_{m,ref}$ and $A_{b,ref}$ refer the area of the triangles prior to model deformation, and $\nabla_m$ and $\nabla_b$ are the gradients over the medial manifold and model boundary.

The last five terms in the objective function, $\{T_{validity_i}, i=1, 2, \ldots, 5\}$, ensure that the cm-rep is an example of valid medial geometry. The inequality constraints required for valid medial geometry have been previously outlined and presented in detail (Pouch et al., 2012; Yushkevich, 2009). Briefly, the first penalty prevents singularities on the medial model boundary by ensuring that the Jacobian of the medial-boundary mapping is positive. The second term ensures that the radial thickness field R remains positive during model fitting, i.e. R>0. The third constrains $\nabla_m R$ at non-edge medial nodes to ensure valid derivative computation for inverse skeletonization. The fourth term prevents degenerate tangent vectors at boundary vertices, and the fifth prevents overlaps and self-intersections in the medial model.

To initialize deformable modeling with cm-rep at diastole, an affine transform is obtained by registering images of the deformable template and the multi-atlas segmentation result with the robust point matching algorithm (Papademetris, X., et al., "Computing 3D non-rigid brain registration using extended robust point matching for composite multi-subject fMRI analysis," *Medical Image Computing and Computer-Assisted Intervention*—Miccai 2003, Pt 2, Vol. 2879, pp. 788-795 (2003)) first and then with the FSL FLIRT tool (Jenkinson and Smith, 2001). To obtain the initialization transform for systole, multi-label images of the open-leaflet template and closed-valve multi-atlas segmentation are registered with the Advanced Normalization Toolkit (Avants, B. B., et al., "A reproducible evaluation of ANTs similarity metric performance in brain image registration," *Neuroimage*, Vol. 54, pp. 2033-2044 (2011)). The template used for initialization of open leaflet modeling is the one shown in FIG. 3, and closed leaflet model fitting is initialized with a rigidly transformed open leaflet model from the same subject. Open and closed leaflet segmentation and deformable modeling are performed sequentially, as shown in FIG. 4. Deformable model fitting is performed by minimizing Eq. 1 by conjugate gradient descent.

The weights used in the Bayesian objective function are given by fitting deformable medial models to 3D TEE images of the mitral leaflets with the guidance of probability maps generated by multi-atlas label fusion. The objective function minimized during model fitting takes the form of Equation 1, where w are the relative weights of terms T. The likelihood term maximizes the probabilities integrated on the model interior and minimizes the probabilities integrated in the background of the model (Equation 2). The regularity terms (Equations 3 and 4) prevent non-physiological distortions of the model, and the validity terms enforce inequality constraints that are required for valid medial geometry. For both open and closed leaflet model fitting, two deformation stages are used. The table below summarizes the terms and weights used in the objective function during each stage of model fitting. The weights used in closed leaflet model fitting are shown in parentheses where they differ from those used in open leaflet model fitting.

The weights for the validity and regularity terms were manually selected such that the individual contributions of these terms to the Bayesian objective were on the same order of magnitude, at least one order of magnitude smaller than the likelihood term. The regularity terms are weighted differently for closed and open leaflet model fitting to accommodate for differences in the probability values used in the likelihood term. Additionally, the leaflet overlap constraint is weighted more heavily for closed leaflet model fitting, since overlap is more likely to occur in the coaptation zone of the closed valve. For all segmentation experiments, the distortion penalty is removed during the second fitting stage to allow the model to capture finer detail of leaflet geometry.

| Term | Description | Fitting Phase 1 | Fitting Phase 2 |
|---|---|---|---|
| $T_{likelihood}$ | Multi-label probability integral | 1 | 1 |
| $T_{validity_1}$ | Boundary Jacobian constraint | $10^{-3}$ | $10^{-3}$ |
| $T_{validity_2}$ | Radial thickness constraint | $10^{-6}$ | $10^{-6}$ |
| $T_{validity_3}$ | Boundary$^{\nabla_m R}$ constraint | 0.5 | 0.5 |
| $T_{validity_4}$ | Loop tangent constraint | $10^{-2}$ | $10^{-2}$ |
| $T_{validity_5}$ | Leaflet overlap constraint | $10^{-4}$ (10) | $10^{-4}$ (0.1) |
| $T_{regularity_1}$ | Medial edge regularizer | 0.1 (1.0) | 0.1 (1.0) |
| $T_{regularity_2}$ | Distortion penalty | 0.1 (10.0) | 0.0 |

3.3. Comparison of Manual and Automatic Segmentation

Automatic segmentation is tested in a leave-one-out framework, using a separate set of atlases for leaflet segmentation at systole and diastole. Both sets consist of 20 manually labeled atlases with separate labels for the anterior and posterior leaflets. For each segmentation test, an atlas is selected as a target image for automatic leaflet segmentation, and the remaining 19 manually labeled atlases are used as references for joint label fusion. The automatic segmentation is compared to its corresponding manual segmentation based on mean boundary displacement (MBD). To ensure a symmetric measurement, MBD is the average of the distances measured from the manual to automated segmentation and from the automated to manual segmentation. Given two meshed shapes P and Q, MBD is defined as follows:

$$MBD = \tfrac{1}{2}(d(P,Q) + d(Q,P)), \quad\quad 5]$$

where d(P,Q) is the distance from P to Q and d(Q,P) is the distance from Q to P. The distance between two meshes is given by $$d(P, Q) \cong \frac{1}{A_p} \int_{x \in p} \inf_{y \in Q} \|x - y\| dA \quad\quad 6]$$

where x is a point on mesh P, y is a point on mesh Q, and $A_p$ is the surface area of mesh P.

Results

Figure 5:
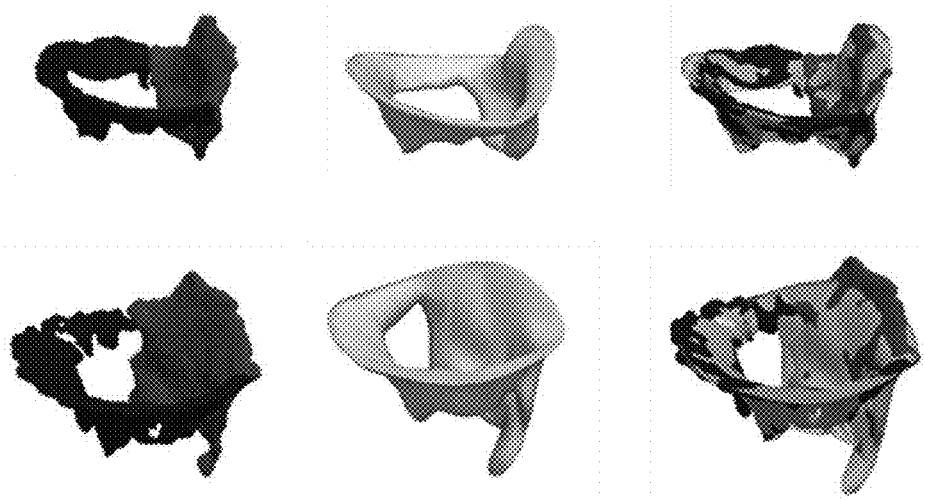
FIGS. 5 and 6 illustrate examples of manual and automatic segmentations of open and closed mitral leaflets.
Figure 6:
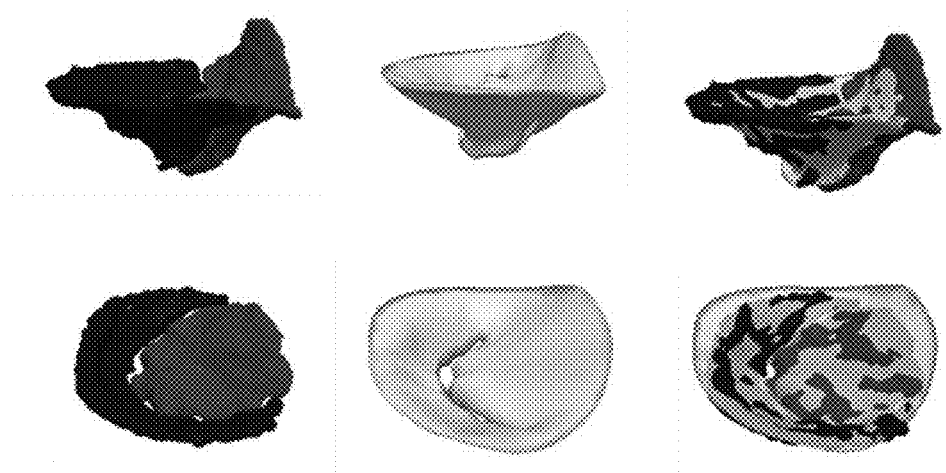

In the cross-validation segmentation tests, the automatic method produced valid segmentations of the open and closed mitral leaflets for 19 of 20 subjects. Image data from the 19 subjects for which segmentation was successful included the entire left ventricle and mitral valve in the field of view. The image data from the subject whose segmentation failed had a smaller field of view excluding most of the left ventricle, which likely contributed to poor registration results and consequently an invalid segmentation. FIGS. 5 and 6 illustrate examples of manual and automatic segmentations of open and closed mitral leaflets. FIG. 5 illustrates automatic and manual open-leaflet segmentations for two subjects: one with a normal mitral valve (top row) and one with an incompetent valve (second row). The left column shows the manual segmentation with the anterior leaflet in light shading and posterior leaflet in dark shading. The center column shows the automatic segmentation, and the right column shows the automatic segmentation overlaid on the manual segmentation. On the other hand, FIG. 6 illustrates automatic and manual closed-leaflet segmentations for two subjects: one with a normal mitral valve (top row) and one with an incompetent valve (second row). The left column shows the manual segmentation with the anterior leaflet in light shading and posterior leaflet in dark shading. The center column shows the automatic segmentation, and the right column shows the automatic segmentation overlaid on the manual segmentation.

Figure 7:
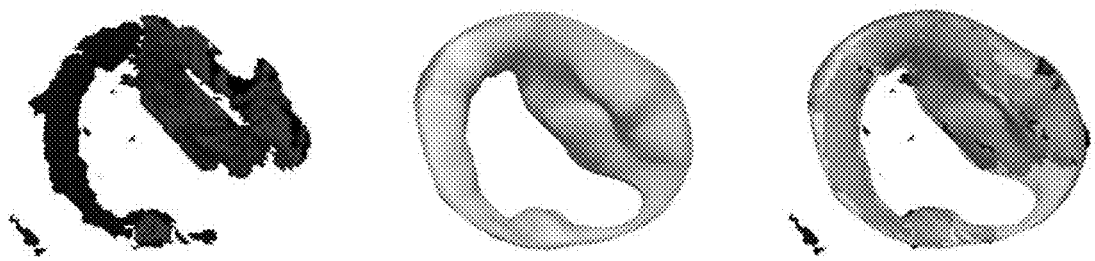
FIG. 7 illustrates an example of an open leaflet segmentation in which multi-atlas label fusion produced leaflet labeling errors and topological inconsistencies due to registration errors.

FIGS. 5 and 6 qualitatively demonstrate that the automatic method captures patient-specific detail of the mitral leaflets, with both normal and pathologic geometries, at two different time points in the cardiac cycle. FIG. 7 presents an example of an open leaflet segmentation in which multi-atlas label fusion produced leaflet labeling errors and topological inconsistencies due to registration errors. FIG. 7 illustrates the multi-atlas segmentation of an open valve, with the anterior leaflet in light shading and posterior leaflet in dark shading (left). The fitted cm-rep of the open leaflets is shown in the center image. The fitted model is overlaid on multi-atlas segmentation (right), illustrating that cm-rep corrects for labeling and topological inconsistencies in multi-atlas segmentation. Nonetheless, with the shape constraints imposed by the cm-rep framework, the automatic method generated a valid, accurate geometric model of the leaflets in the image data.

Figure 8:
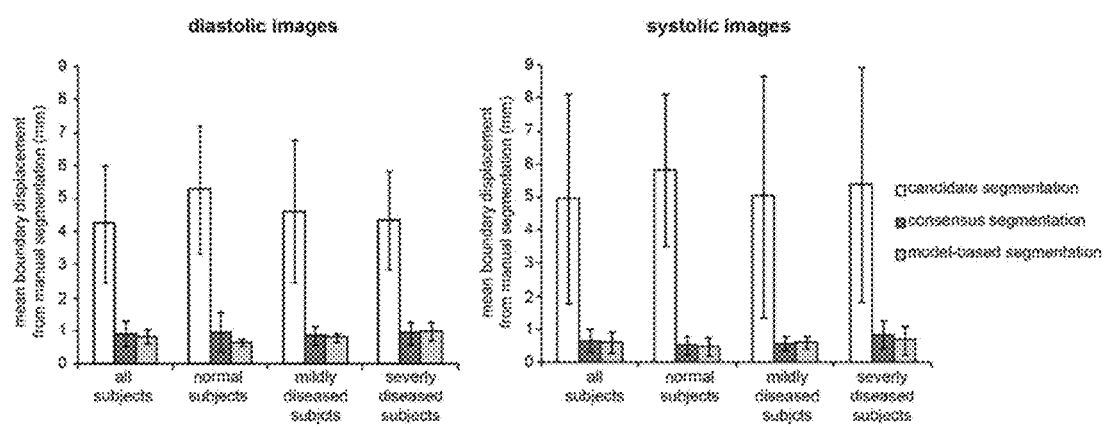
FIG. 8 presents the accuracy of each intermediate step and the output of fully automated image analysis at mid-diastole and mid-systole.

FIG. 8 presents the accuracy of each intermediate step and the output of fully automated image analysis at mid-diastole and mid-systole. In FIG. 8, segmentation results are shown at diastole (left) and systole (right). The bar graphs show the mean boundary displacement between the manual segmentation and each of the following: the candidate segmentations obtained by single-atlas registration, the consensus segmentation generated by joint label fusion, and the model-based segmentation created with the deformable cm-rep. The results are broken down by disease category: all subjects, subjects with normal mitral valve function, mildly diseased subjects, and subjects with severe mitral regurgitation. The mean boundary displacement between the manual segmentation and each of the following outputs is given: the candidate segmentations generated by individual atlases, the consensus segmentation obtained by joint label fusion of the candidate segmentations, and the model-based segmentation generated by fitting the deformable medial model to the target image. The results are broken down into four categories: all subjects grouped together, subjects with normal mitral valve function, mildly diseased subjects, and subjects with severe mitral valve disease. In all categories, the accuracy of the consensus segmentation was significantly greater than the average accuracy of individual candidate segmentations and in some cases was greater than the best candidate segmentation. The best individual candidate segmentations had mean boundary displacements ranging between 0.6 to 1.2 mm (diastole) and between 0.3 and 1.6 mm (systole). These observations demonstrate that joint label fusion improves segmentation accuracy when low-quality candidate segmentations are created as a result of registration error. The accuracy of model-based segmentation was consistent with that of the consensus segmentation, which is expected since the multi-atlas segmentation results guide model deformation. Note that the goal of cm-rep modeling is not necessarily to improve segmentation accuracy, but to obtain a geometric description that establishes a shape-based coordinate system on the leaflets.

Figure 9:
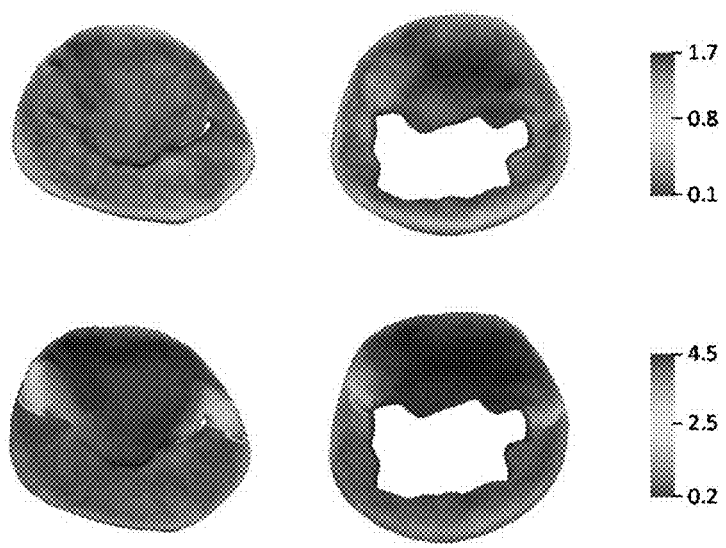
FIG. 9 (top row) illustrates maps of the localized distances between the manual and automatic segmentations for the open and closed leaflets, and FIG. 9 (bottom row) illustrates that the largest discrepancies in anterior and posterior leaflet labeling occur in the tissue adjacent to the commissures.
Figure 10:
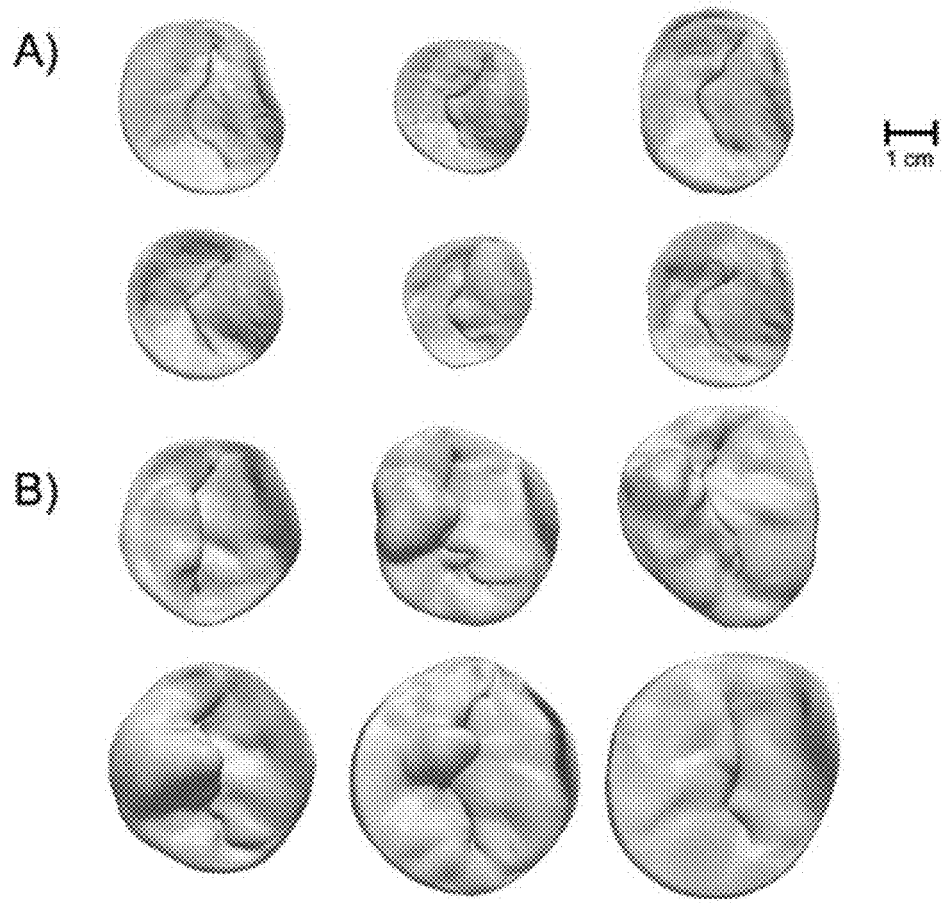
FIG. 10(a) provides atrial views of six normal mitral valves as obtained using the presently disclosed methods.
FIG. 10(b) provides atrial views of six myxomatous mitral valves with posterior leaflet defects.

Table I presents the mean distance between the manual and automatic segmentations, for both the open and closed leaflets. In Table I, mean distances between the automatic and manual segmentations of the mitral leaflets are shown at diastole and systole. 95% of points on the manual and automatic segmentations fall within the $95^{th}$ percentile distance. The distances are computed for a single-label segmentation (leaflets combined) and for the anterior and posterior leaflet segmentations individually. When considering the segmentation as a whole, the mean distance between the manual and automatic segmentations was 0.8±0.2 mm (open) and 0.6±0.2 mm (closed). Here, the standard deviation refers to the variation from the mean distance observed in the 19 successful segmentation tests. These distances are on the order of one voxel, as the average isotropic voxel resolution is roughly 0.7 mm. 95% of points on the manual and automatic segmentations were less than 1.8 mm apart for the open leaflets and 1.4 mm for the closed leaflets. FIG. 9 illustrates maps showing localized mean distance between the automatic and manual segmentations in millimeters. The results are shown for the leaflets at systole (left column) and diastole (right column). Segmentation accuracy is evaluated in terms of a single-label model (top row) and multi-label model (bottom row), in which the anterior and posterior leaflet segmentations are evaluated independently. FIG. 9 (top row) shows maps of the localized distances between the manual and automatic segmentations for the open and closed leaflets. These maps show that the largest discrepancies occur around the posterior annulus and the free edge of the anterior leaflet, indicating that the manual and automatic segmentations included slightly different amounts of tissue around the posterior annulus and chordal tissue at the anterior leaflet margin.

TABLE I

| | | mean distance (mm) | $95^{th}$ percentile distance (mm) |
|---|---|---|---|
| diastole (open leaflets) | both leaflets | 0.8 ± 0.2 | 1.8 |
| | anterior leaflet | 0.9 ± 0.3 | 3.7 |
| | posterior leaflet | 1.0 ± 0.3 | 2.3 |
| systole (closed leaflets) | both leaflets | 0.6 ± 0.2 | 1.4 |
| | anterior leaflet | 0.8 ± 0.4 | 4.5 |
| | posterior leaflet | 1.0 ± 0.3 | 2.5 |

When evaluating the anterior and leaflet segmentations individually, the mean distances between the automatic and manual leaflet models were: 0.9±0.3 and 1.0±0.3 mm for the open anterior and posterior leaflets, and 0.8±0.4 and 1.0±0.3 for the closed anterior and posterior leaflets. 95% of points on the manual and automatic segmentations were within 3.7 and 2.3 mm for the open anterior and posterior leaflets, and within 4.5 and 2.5 mm for the closed anterior and posterior leaflets. FIG. 9 (bottom row) illustrates that the largest discrepancies in anterior and posterior leaflet labeling occur in the tissue adjacent to the commissures.

To examine the effect of reference atlas set construction on the multi-atlas segmentation results, joint label fusion was repeated using reference atlases from subgroups of the population: (1) subjects with normal mitral valve function or mild mitral regurgitation, and (2) subjects with severe mitral regurgitation. For example, images acquired from normal and mildly diseased subjects were segmented with atlases from the same group and then with atlases constructed from severely diseased subjects only. In these experiments, normal and mildly diseased subjects were combined into a single subset, since more than six atlases were needed to generate valid segmentations for most subjects. Table II presents the multi-atlas segmentation results produced when subsets of the original atlas sets are used. In Table II, mean boundary displacement between the multi-atlas consensus segmentation and manual segmentation when different reference atlas subsets are used in a leave-one-out cross-validation experiment. The number of invalid consensus segmentations is indicated in parentheses. Eight atlases from severely diseased subjects and 11 atlases from normal and mildly diseased subjects were included in the test. Note that the normal atlas whose segmentation failed when all reference atlases were used was excluded from these experiments. The results indicate that consensus segmentation accuracy depends to some extent on both atlas set size and composition of the reference atlas set. For one, there were more invalid segmentations generated when subjects in a given category were segmented with references atlases from another category. For all tests except for normal systolic image segmentation, it is notable that one normal subject's and one severely diseased subject's segmentations were invalid when either one of the reference atlas subsets was used. This observation suggests that segmentation accuracy for those patients dramatically increased when the reference atlas subsets were combined into a single larger reference atlas set.

TABLE II

| target images | | Normal and mild disease reference atlas set | Severe disease reference atlas set |
|---|---|---|---|
| diastole (open leaflets) | normal and mild disease | 0.7 ± 0.2 mm (1 of 11) | 0.9 ± 0.1 (3 of 11) |
| | severe disease | 1.1 ± 0.5 mm (4 of 8) | 0.9 ± 0.2 (1 of 8) |
| systole (closed leaflets) | normal and mild disease | 0.5 ± 0.3 mm (0 of 11) | 0.7 ± 0.4 mm (2 of 11) |
| | severe disease | 0.8 ± 0.4 mm (2 of 8) | 0.8 ± 0.6 mm (1 of 8) |

To estimate the accuracy of fully automated leaflet thickness measurements, the deformable medial model was fitted directly to each manual segmentation so that corresponding leaflet thickness measurements could be compared. Leaflet thickness was defined as the distance between the atrial and ventricular boundary nodes associated with each medial node. Mean thicknesses of 1.7±0.5 mm (automated) and 1.5±0.4 mm (manual) were computed for the open valve and a mean thickness of 1.5±0.4 mm (both manual and automated) was computed for the closed valve. These thickness measurements are on the order of 2 to 3 voxels. The mean difference in thickness derived from automated and manual image analysis was 0.2±0.8 mm (open valve) and −0.1±0.6 mm (closed valve), which is on the order of 1 voxel. The largest discrepancies in the manual and automated measurements occurred on the leaflet rough zones, where the automated segmentation revealed more leaflet thickening. There was no statistically significant difference in leaflet thickness in normal, mildly diseased, and severely diseased subjects, which is not surprising since the etiology of valve disease in this population is not generally associated with leaflet thickening. Note that this thickness comparison is influenced by the accuracy of model fitting to the manual segmentation.

Mean boundary displacements of 0.4±0.1 mm (open valve) and 0.3±0.03 mm (closed valve) between the fitted model and manual segmentation were computed.

The computational time of the automated segmentation method, which is currently not parallelized or optimized for time efficiency, was on par with the time needed for an expert to manually segment the valve, which is on the order of several hours depending on the quality of the image data and the complexity of valve geometry. The majority of the time needed for automated segmentation is devoted to deformable registration, which requires several hours for the large image volumes processed. Label fusion takes approximates 10 minutes and deformable model fitting requires roughly 30 minutes on a single processor, depending on the extent of which the initialized template must deform to match the leaflets in the target image data.

Case Study: Detection of Myxomatous Degeneration

The present 3D segmentation methods can detect and identify even the most complex valve pathologies, such as myxomatous degeneration and prolapse, or flail segments. To demonstrate this ability, the present methods were evaluated on mid-systolic transesophageal 3DE images acquired from 22 subjects with myxomatous degeneration and from 22 subjects with normal mitral valve morphology. Relative to manual image analysis, the automated method accurately represents both normal and complex leaflet geometries with a mean boundary displacement error on the order of one image voxel. A detailed quantitative analysis of the valves revealed statistically significant differences between normal and myxomatous valves with respect to numerous aspects of annular and leaflet geometry.

FIGS. 10(a) and 10(b) illustrate representative patient-specific models of normal and diseased mitral leaflets, respectively, generated from the automated 3DE image analysis approach described herein. The valves are shown to scale and FIG. 10(b) visually demonstrates the enlarged size and abnormal leaflet morphology of valves with myxomatous degeneration. Quantitative image-derived measurements of mitral annular and leaflet morphology are given in Table III, below.

TABLE III

Mitral annular and leaflet measurements computed from automated 3DE image analysis.

| | Measurement | Normal | Diseased | p-value |
|---|---|---|---|---|
| Annulus | Annular circumference | 114.2 ± 11.9 mm | 143.4 ± 16.2 mm | <0.01 |
| | Septolateral diameter | 31.0 ± 3.1 mm | 39.8 ± 5.6 mm | <0.01 |
| | Commissural width | 33.1 ± 4.1 mm | 41.4 ± 5.5 mm | <0.01 |
| | Annular height | 8.7 ± 1.6 mm | 10.9 ± 2.4 mm | <0.01 |
| | Annular height to commissural width ratio (AHCWR) | 26.4 ± 3.8% | 26.6 ± 5.9 % | 0.88 |
| Leaflets | Anterior leaflet surface area | 5.09 ± 1.14 cm$^2$ | 8.35 ± 2.08 cm$^2$ | <0.01 |
| | Posterior leaflet surface area | 6.40 ± 1.18 cm$^2$ | 11.00 ± 2.72 cm$^2$ | <0.01 |
| | Percent surface area of posterior leaflet above posterior annular plane | 20.9 ± 14.2% | 74.2 ± 17.3% | |
| | Maximum height of posterior leaflet above posterior annular plane | 1.9 ± 0.9 mm | 8.1 ± 3.4 mm | <0.01 |
| | Mean anterior leaflet thickness | 1.6 ± 0.2 mm | 2.0 ± 0.2 mm | <0.01 |
| | Maximum anterior leaflet thickness | 2.8 ± 0.5 mm | 3.7 ± 0.7 mm | <0.01 |
| | Mean posterior leaflet thickness | 1.6 ± 0.2 mm | 1.9 ± 0.2 mm | <0.01 |
| | Maximum posterior leaflet thickness | 2.7 ± 0.3 mm | 4.6 ± 0.9 mm | <0.01 |

Figure 11:
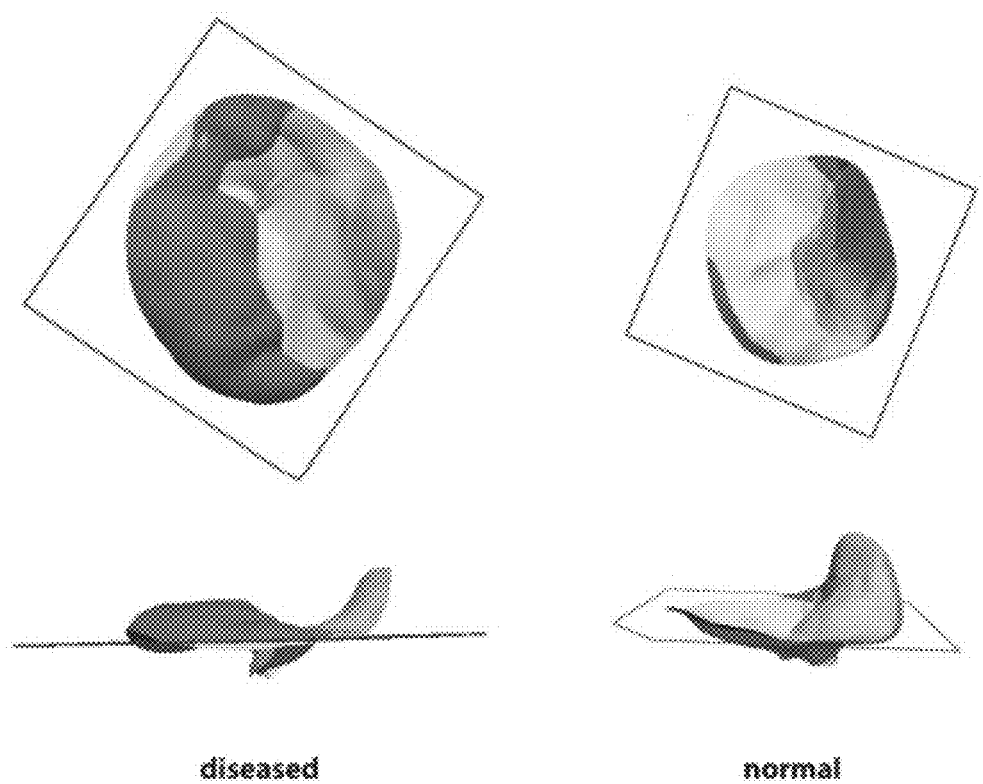
FIG. 11 illustrates mean models of a myxomatous mitral valve (left) and normal mitral valve (right), shown to scale. Leaflet thickness is displayed using shading.
Figure 12:
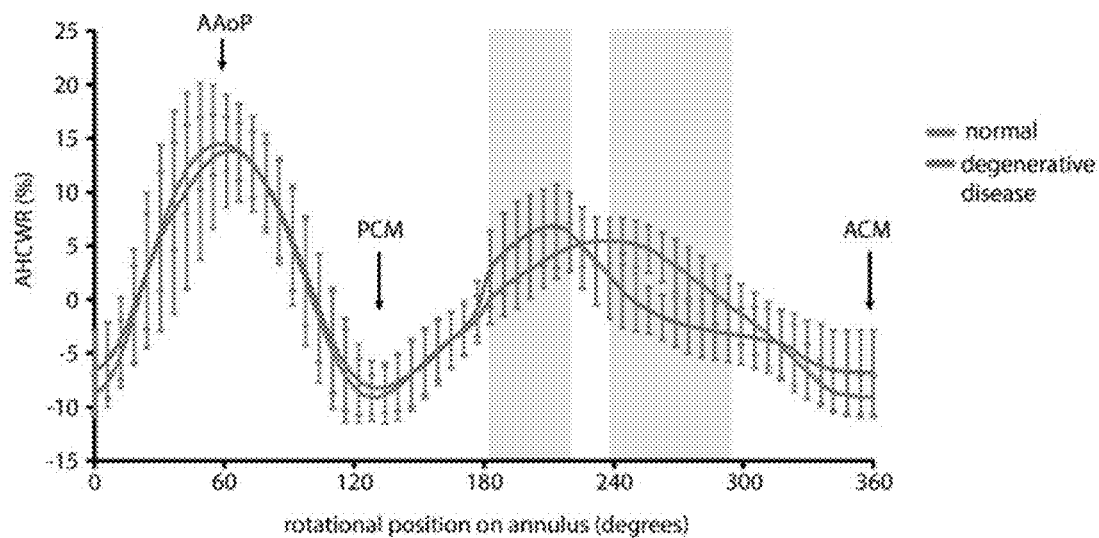
FIG. 12 shows the mean±standard deviation of the annular height to commissural width ratio (AHCWR) plotted as a function of rotation position along the mitral annulus. The AHCWR curve for the myxomatous valves and for the normal valves, respectively are shown. Statistically significant differences in regional AHCWR are indicated in gray. (AAoP=anterior aortic peak of the annulus, PCM=posterior commissure, ACM=anterior commissure).

Each of the measurements except for global annular height to commissural width ratio (AHCWR) was statistically significant (p<0.01) in differentiating the myxomatous and normal valves based on an independent Student t-test. In the diseased cases, most of the posterior leaflet surface protruded above the posterior annular plane into the left atrium. In the control cases, most of the posterior leaflet surface was below the posterior annular plane, as shown in FIG. 11. To assess the regional geometry of the mitral annulus independent of commissural diameter, the regional AHCWR was plotted as a function of rotational position on the mitral annulus (FIG. 12). Although there was no statistically significant difference between the global AHCWR measurements in the normal and diseased groups presented Table III, there were statistically significant differences in localized regional AHCWR measurements along the posterior annulus as shown in gray in FIG. 12. The localized regional AHCWR differences were detected by computing independent Student t-tests at incremental positions on the annular contour with false discovery rate adjustment to account for multiple comparisons. The well-described saddle shape of the mitral annulus can be appreciated in the mean AHCWR curve of the normal subjects, but prominent distortions are apparent in the posterior annulus of valves with myxomatous degeneration.

Figure 13:
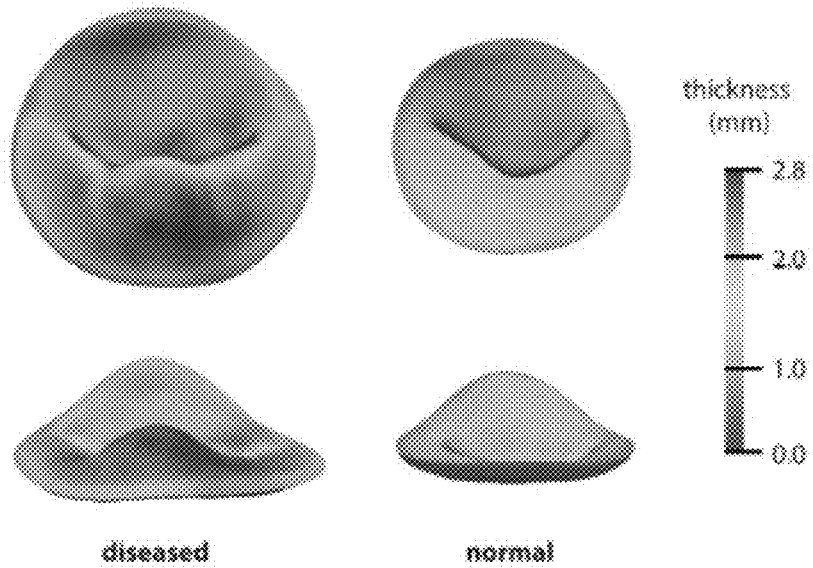
FIG. 13 shows a mitral valve with posterior leaflet prolapse (left) and normal morphology (right) from atrial and medial viewpoints. The portion of the posterior leaflet above the posterior annular plane, whose bounds are indicated by the square, is shown.

Generalized Procrustes analysis (see Dryden, I. L., Mardia, K. V., 1998. Statistical shape analysis. Chichester: John Wiley & Sons) was used to compute mean models of the degenerate and normal valves. FIG. 13 illustrates mean models of myxomatous and normal mitral valves from two viewpoints with thickness measurements displayed in color. The mean diseased model shows increased leaflet thickness in the prolapsed segment of the posterior leaflet.

Accordingly, the present methods can be used to illustrate highly detailed, patient-specific valve morphology, and not merely generic valve shapes that approach the normal condition.

Discussion

The described automatic leaflet segmentation method makes significant contributions to both 3D image analysis and the study of in vivo mitral valve geometry. The technique is the first of its kind to use both multi-atlas label fusion and deformable modeling with cm-rep to generate patient-specific models of the mitral leaflets from 3D TEE images. The method is effectively applied to different time points in the cardiac cycle (mid-diastole and mid-systole) and accurately captures different geometric configurations of the mitral leaflets (open and closed). Because these two geometries can be captured, it is possible using the presently disclosed methods to segment the valve at any time point in the cardiac cycle, which permits the present methods to approximate 4D analysis. See, e.g., A. M. Pouch et al./Medical Image Analysis 18 (2014) 118-129, which is hereby incorporated by reference in its entirety. With modifications, such as the use of groupwise label fusion (see Wang, H. and Yushkevich, P. A., 2013. Groupwise segmentation with multi-atlas joint label fusion. Med Image Comput Comput Assist Interv. 16(Pt 1): 711-8) and the use of trajectory constraints on model fitting, the disclosed methods could be extended to a truly 4D segmentation algorithm. First, the superiority of multi-atlas joint label fusion over single-atlas-based segmentation is clearly demonstrated in the experiments (FIG. 8) that evaluate the accuracy of each step in the image analysis algorithm. Secondly, multi-atlas joint label fusion and cm-rep prove to be highly complementary segmentation techniques. Joint label fusion automatically generates probabilistic segmentations of the mitral leaflets, which are incorporated as the likelihood of the Bayesian posterior probability used in cm-rep fitting. These probability maps are the driving force for an accurate model-based segmentation. At the same time, the regularization and validity constraints imposed by the cm-rep framework function as strong priors in the posterior probability. These two components of the Bayesian objective function, the likelihood and regularization prior, work together to ensure an accurate, topologically consistent labeling of the mitral leaflets in the target image data, as shown in the examples in FIGS. 5 and 6.

FIG. 7 shows that deformable modeling with cm-rep aids in circumstances in which atlas-based segmentation produces topological inconsistencies or labeling errors. While probabilistic segmentations generated by joint label fusion do not identify correspondences, deformable modeling with cm-rep imposes a shape-based coordinate system on the mitral leaflets and establishes correspondences on leaflets of different subjects. Anatomic landmarks identified in the cm-rep coordinate system facilitate measurement of clinically relevant features of leaflet and annular geometry (Pouch et al., 2012). In addition, the ability to measure localized leaflet thickness is a unique advantage of using a volumetric segmentation method and cm-rep, as leaflet thickness is a relevant parameter in constitutive models of the mitral valve and characterization of myxomatous disease. Although the evaluation of automated leaflet thickness assessment presented in Section 3 is not an ideal validation method, the results suggest that the error in fully automated measurements of localized leaflet thickness are less than the mean boundary displacement between the automated and manual segmentations. Moreover, the leaflet thicknesses presented herein are on par with previously reported echocardiographic and ex vivo measurements (Louie, E. K., et al., "Transesophageal echocardiographic quantitation of mitral leaflet thickness in patients with mitral valve prolapse," *Journal of the American College of Cardiology*, Vol. 25, p. 191A (1995); Sahasakul, Y., et al., "Age-related changes in aortic and mitral valve thickness: implications for two-dimensional echocardiography based on an autopsy study of 200 normal human hearts," *Am J Cardiol*, Vol. 62, pp. 424-430 (1988).

Unlike most of the existing methods for mitral leaflet segmentation, this technique models mitral leaflet and annular geometry without the need for user interaction, thereby completely eliminating the issue of inter- and intra-observer variability in image analysis. Once a set of manually labeled atlases is obtained, there is no need for an observer to initialize or supervise segmentation. In addition to being fully automated, the segmentation method yields spatially dense, detailed representations of a given patient's valve. Manual segmentation of the mitral valve requires several hours of an expert's time. The automated method presented herein can be performed without any expert's time or knowledge of the mitral valve and how it appears in ultrasound images. Therefore, the method is more accessible to users who have limited experience in interpreting mitral valve geometry in ultrasound images. Moreover, the automated analysis can be performed immediately after image acquisition without any user interaction. The development of this fully automated technique is a significant step towards creating a practical, informative tool for pre-operative assessment of patient-specific mitral valve morphology.

The inventors' approach improves on the only existing fully automatic mitral valve segmentation method in the literature (mean boundary displacement error of ~0.7 mm vs. 1.54 mm in (Ionasec et al., 2010)) and is competitive with a semi-automatic method that requires some user input (0.76±0.65 mm in (Schneider et al., 2011)). This error is in line with inter-observer variability in manual image analysis, where mean boundary displacements of 0.60±0.17 mm (mitral leaflets) and 2.38±0.76 mm (mitral annulus) have been reported (Jassar, A. S., et al., "Quantitative mitral valve modeling using real-time three-dimensional echocardiography: technique and repeatability," *Ann Thorac Surg*, Vol. 91, pp. 165-171 (2011). The inventors' results are consistent with this previous study, as FIG. 9 (top row) shows that the greatest variability in manual and automatic segmentation occurs at the boundaries of the model, rather than along the leaflet surfaces. This variability is a consequence of the annulus, or model edge, being located at a somewhat arbitrary (non-intensity-based) boundary between the leaflets and the surrounding tissue to which they are anchored. Discrepancies between the manual and automated segmentations were also observed on the anterior leaflet free edge. These discrepancies are due to the lack of a well-defined criterion for demarcating the leaflet free edge at prominent chordal attachment sites. Therefore, the manual-versus-automated segmentation comparison may be influenced by inclusion of variable amounts of chordal attachment tissue along the free edges and of variable amounts of leaflet attachment tissue around the annulus. Additionally, areas of signal dropout present in a manual segmentation may be filled in by the model-based segmentation. Overall, the leaflet segmentation methods presented in the literature report average differences between manual and automatic segmentations on the order of one to two voxels, which compares favorably to the average error of approximately one voxel measured herein. The $95^{th}$ percentile distances reported here (1.6 mm, on average) are in line with those reported in (Schneider et al., 2011), which were 2.1 mm.

To the best of the inventors' knowledge, all previous studies have evaluated mitral leaflet segmentation accuracy with respect to a single-label model, where the leaflets were not assigned different labels. The present method evaluates segmentation accuracy in terms of both single and multi-label models. As anticipated, somewhat larger discrepancies between the manual and automatic segmentations were observed when the anterior and posterior leaflet delineations were independently evaluated. These discrepancies were localized to the tissue between the commissures and annulus, indicating that the manual and automatic observers consistently identified valve tissue in this area, but assigned these voxels different labels. This observation is expected for two reasons. For one, the coapted leaflets are difficult to distinguish, especially in the commissural region, by both expert and automated observers. Secondly, the tissue in the commissural area varies substantially between subjects and may in fact constitute a separate commissural leaflet. The fact that the greatest error is localized to this region indicates that the manual and automatic segmentations are in close agreement in other clinically significant aspects of leaflet geometry, including the leaflet bellies and coaptation zone.

Image-derived, anatomically accurate models of in vivo leaflet geometry have a number of clinically significant applications. The models can assist in the diagnosis of mitral valve disease, guide surgical interventions such as mitral valve repair, and be used as input to biomechanical simulations of valve function. Emphasizing the importance of characterizing in vivo valve morphology, Lang and Adams point out that the surgical treatment of functional mitral regurgitation with downsized complete ring annuloplasty is frequently performed irrespective of patient-specific valve geometry (Lang and Adams, 2012). Not surprisingly, this surgical repair strategy has been associated with unexpectedly high rates of recurrent mitral regurgitation. Automatic modeling of in vivo mitral valve geometry can lead to improved clinical outcomes by aiding in the simulation and selection of repair strategies involving different annuloplasty ring characteristics and subvalvular adjustments (Lang and Adams, 2012). Along these lines, the inventors have shown that image-derived leaflet models can be loaded with physiologic pressures using finite element analysis to estimate stress distributions in normal and regurgitant valves (A. M. Pouch et al./Journal of Biomechanics 45 (2012) 903-907). Such information is useful for understanding stress-related phenomena associated with mitral valve repair failures and for identifying patients with high leaflet stresses in the early post-operative period. Several research groups have also explored the integration of mitral valve imaging and biomechanical modeling for simulation of mitral valve dynamics and computation of leaflet mechanics (Burlina, P., et al., "Patient-specific modeling and analysis of the mitral valve using 3D-TEE," *Lecture Notes in Computer Science*, pp. 135-146 (2010); Mansi, T., et al., "An integrated framework for finite-element modeling of mitral valve biomechanics from medical images: Application to MitralClip intervention planning," *Med Image Anal.* (2012); Rausch, M. K., et al., "Mitral valve annuloplasty: a quantitative clinical and mechanical comparison of different annuloplasty devices," *Ann Biomed Eng*, Vol. 40, pp. 750-761. (2012); Sacks, M. S., et al., "In-vivo dynamic deformation of the mitral valve anterior leaflet," *Ann Thorac Surg*, Vol. 82, pp. 1369-1377 (2006); Votta, E., et al., "Mitral valve finite-element modeling from ultrasound data: a pilot study for a new approach to understand mitral function and clinical scenarios," *Philos Transact A Math Phys Eng Sci*, Vol. 366, pp. 3411-3434 (2008)).

At the same time, the presently disclosed deformable model is amendable to statistical shape analysis. For example, given a population of valve geometries, it is possible to quantitatively compare valve geometries of different subjects and compute a mean shape and determine variations in valve shape using standard shape analysis techniques. As described in A. M. Pouch, et al., Ann Thorac Surg 2014; 97:71-7 (incorporated herein by reference in its entirety), the present inventors obtained image-derived 3D mitral annular contours from a population of human subjects with normal mitral valve morphology and computed an average mitral annular shape and variations in that geometry. This information would prove useful in creating new annuloplasty ring designs that more accurately replicate the shape of a normal mitral annulus.

Additionally, the present image-derived models of heart valves can be printed and prototyped using 3D printing technology. See, e.g., Witschey W R T, et al., Ann Thorac Surg 2014; 98:691-4 (incorporated herein by reference in its entirety).

Those skilled in the art will appreciate that errors produced by atlas-based segmentation are mainly due to registration errors that occur when registration associates wrong regions from an atlas to the target image. Invalid registrations occurred with respect to 1 of 20 atlases in which the mitral leaflets were imaged with a different field of view. To prevent these invalid segmentations, multiple atlas sets can be constructed using images acquired in different modes and with varying fields of view. Alternatively, a feature detection method can be developed to identify a specific field of view in the target image data prior to segmentation. Those skilled in the art will also appreciate that optimal atlas construction may be explored to determine the minimum number of atlases needed to maintain the same degree of accuracy, comparable to inter-observer variability in manual segmentation. It has been shown that increasing the atlas set size improves segmentation accuracy, but with diminishing returns (Wang, H., et al., "A learning-based wrapper method to correct systematic errors in automatic image segmentation: consistently improved performance in hippocampus, cortex and brain segmentation," *Neuroimage*, Vol. 55, pp. 968-985 (2011). The incorporation of 4D regularization constraints in the multi-atlas label fusion and deformable modeling steps can potentially prevent leaflet labeling inaccuracies.

While the current algorithm is not optimized for efficiency, there are several ways in which computation time can be significantly reduced to enhance the method's clinical applicability. Both the multi-atlas segmentation and deformable modeling steps are highly parallelizable and well-suited for GPU implementation. Smaller regions of interest can be used for deformable registration, and less computationally expensive image registration algorithms can be explored. A multi-resolution implementation of deformable modeling can be used, which would decrease the time required for computation of the regularization terms. In addition, a scheme for automatically selecting the weights used in the Bayesian objective function may further enhance model fitting accuracy.

Physiological models of the mitral valve constructed from 3D TEE provide visual and quantitative information about in vivo mitral valve morphology that can aid in the diagnosis and treatment of mitral valve disease. To expedite image analysis in clinical and research settings, the presented method generates quantitative geometric models of the mitral valve without any need for user interaction. The integration of multi-atlas joint label fusion and 3D deformable modeling techniques provides for a model-based Bayesian segmentation that is accurate relative to expert manual image analysis. This methodology is a step towards developing a fully automatic tool that can be easily used to study mitral valve geometry and dynamics and aid in image-based surgical guidance.

Those skilled in the art will also appreciate that the invention may be applied to other applications and may be modified without departing from the scope of the invention. For example, the models of in vivo leaflet geometry generated with the methodology of the invention have a wide range of clinical applications including quantitative morphometry, interactive visualization, and biomechanical simulation. Those skilled in the art also will appreciate that the methods of the invention are not limited to transesophageal echocardiogram images but may also be applied to transthoracic echocardiogram images as well.

As noted above, those skilled in the art will further appreciate that the methods described herein may be used to automatically segment aortic, pulmonic, and/or tricuspid valves in addition to the mitral valve. For example, the image segmentation methodology may also be applied for imaging the aortic valve. Because the aortic valve has a more complex geometry than the mitral valve, it is possible to use a branching medial model, rather than the non-branching medial model that is used for the mitral valve. Branching models employ a different formulation/paradigm of the deformable medial modeling problem, which is described in Yushkevich P M, IPMI 2013, LNCS 7917, pp. 280-291, 2013 (incorporated herein by reference in its entirety).

As in the case of the mitral valve models, the image-derived models of the aortic valve can be used for statistical shape analysis. The preceding is applicable to both tricuspid and bicuspid aortic valves.

In addition, the methods described herein are not limited to echocardiography and may be applied to any imaging modality, such as computed tomography or magnetic resonance imaging, that are able to delineate the valve leaflets.

Accordingly, the scope of the invention is not intended to be limited to the exemplary embodiments described above, but only by the appended claims.

What is claimed:

1. A fully automated method for leaflet and/or annulus segmentation in 3D echocardiographic ultrasound images using a set of expert-labeled 3D echocardiographic image atlases of leaflets and/or a deformable medial model template of a valve, comprising:
    acquiring a 3D target image to segment;
    registering the image atlases to the target image and propagating atlas labels to the target image to obtain a set of candidate segmentations;
    generating a probabilistic consensus segmentation using joint label fusion; and
    applying 3D deformable modeling to the probabilistic consensus segmentation to generate a 3D geometric model of the leaflets and/or annulus in the target image.

2. The method of claim 1, further comprising geometrically modeling a mitral valve of the target image using a continuous medial representation template of mitral leaflets.

3. The method of claim 2, wherein the continuous medial representation template is initialized to a multi-atlas probabilistic segmentation and the template is deformed to obtain a medial model of the mitral leaflets in the target image.

4. The method of claim 3, wherein the continuous medial representation template is first fitted to target image data of an open mitral valve at diastole, and the fitted diastolic model is used to initialize model fitting of the subject's closed valve at systole.

5. The method of claim 1, wherein the registering step includes using cross-correlation as a similarity metric and applying a Gaussian regularizer.

6. The method of claim 1, wherein each atlas is warped into a space of the target image using a deformation field obtained by image registration between the atlas and the target image in order to generate a candidate segmentation of the target image.

7. The method of claim 1, wherein generating a probabilistic consensus segmentation using joint label fusion applies a spatially varying weighted voting method whereby each atlas contributes to a final segmentation according to a weight, with atlases more similar to a target image receiving higher weights.

8. The method of claim 7, wherein registration of atlas images to the target image uses a symmetric diffeomorphic transformation model.

\* \* \* \* \*